US 9,694,676 B2

(12) United States Patent
Bandy

(10) Patent No.: US 9,694,676 B2
(45) Date of Patent: Jul. 4, 2017

(54) DRIVETRAIN FOR INDEPENDENT SUSPENSION SYSTEM

(71) Applicant: Ronald Scott Bandy, Visalia, CA (US)

(72) Inventor: Ronald Scott Bandy, Visalia, CA (US)

( * ) Notice: Subject to any disclaimer, the term of this patent is extended or adjusted under 35 U.S.C. 154(b) by 0 days.

(21) Appl. No.: 15/375,099

(22) Filed: Dec. 11, 2016

(65) Prior Publication Data

US 2017/0120748 A1      May 4, 2017

Related U.S. Application Data

(63) Continuation-in-part of application No. 14/087,552, filed on Dec. 26, 2013, now abandoned.

(51) Int. Cl.
*B60K 17/354* (2006.01)
*B60K 17/344* (2006.01)
*B60K 17/16* (2006.01)
*B60G 7/02* (2006.01)
*B60K 17/22* (2006.01)
*B60G 3/20* (2006.01)

(52) U.S. Cl.
CPC ............. *B60K 17/354* (2013.01); *B60G 3/20* (2013.01); *B60G 7/02* (2013.01); *B60K 17/165* (2013.01); *B60K 17/22* (2013.01); *B60K 17/344* (2013.01); *B60G 2200/1442* (2013.01)

(58) Field of Classification Search
CPC .... B60K 17/354; B60K 17/165; B60K 17/22; B60K 17/344; B60G 3/20; B60G 2200/1442
See application file for complete search history.

(56) References Cited

U.S. PATENT DOCUMENTS 3,420,327 A  *  1/1969  Nallinger ............. B60K 17/046
                                              180/255
3,993,152 A  *  11/1976  Fogelberg ............ B60K 17/344
                                              180/249

(Continued)

*Primary Examiner* — Joseph Rocca
*Assistant Examiner* — Michael Stabley

(57) ABSTRACT

Disclosed herein is a report on a drivetrain specifically designed to operate in conjunction with the Extreme-Travel Independent Suspension System. In a prior disclosure, we introduced a drivetrain concept derived from the unique configuration of the suspension system. The concept defines several elements, one element is a gearbox that is fabricated into the frame, the gearbox being called the reverse power coupler. Other elements of the concept include a differential mounted offset power coupler and differential housing assemblies. The drivetrain cooperates with the suspension configuration of upper and lower leading and trailing links thereby retaining the suspension system's fundamental properties—handling quality like a double A-arm independent suspension system and travel and articulation capabilities similar to Ford's Twin I-Beam front suspension system. This report integrates the elements introduced in the prior disclosure with novel mechanistic features of the drivetrain. The features concentrate on the means by which power is transmitted from a differential housing to the wheels. Included in the features are the operations of the elements and the association of the elements with short and long axle shafts. The axle shafts serve as the principle conduits for transmitting power from one element to another.

21 Claims, 22 Drawing Sheets

(56) References Cited

U.S. PATENT DOCUMENTS

| | | | | |
|---|---|---|---|---|
| 4,611,681 | A | * | 9/1986 | Krude ................. B60G 3/24 180/359 |
| 6,035,956 | A | * | 3/2000 | Maurer ............... B60B 11/02 180/383 |
| 6,250,415 | B1 | * | 6/2001 | Seto .................. B60K 17/22 180/337 |
| 7,294,082 | B2 | * | 11/2007 | Lim ................... B60K 17/344 475/221 |
| 8,464,611 | B1 | * | 6/2013 | Chandler ............ B60K 17/165 74/607 |
| 9,096,110 | B1 | * | 8/2015 | Bandy ................. B62D 7/08 |
| 9,114,682 | B1 | * | 8/2015 | Bandy ................. B60G 7/02 |
| 2008/0307914 | A1 | * | 12/2008 | Trapp ................. B60K 17/16 74/416 |
| 2009/0301830 | A1 | * | 12/2009 | Kinsman ............ B60G 15/063 188/289 |
| 2011/0272900 | A1 | * | 11/2011 | Lares ................. B60G 3/20 280/5.513 |
| 2012/0031688 | A1 | * | 2/2012 | Safranski ............ B60G 3/14 180/54.1 |

\* cited by examiner

DRIVETRAIN FOR INDEPENDENT SUSPENSION SYSTEM

CROSS-REFERENCE TO RELATED APPLICATIONS

This application expounds on the drivetrain specifically designed to operate in conjunction with the Extreme-Travel Independent Suspension System. The suspension system and drivetrain are covered in U.S. patent application Ser. Nos. 14/059,062 and 14/087,552, respectively.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Disclosed in patent application Ser. No. 14/059,062 is a novel independent suspension concept that is a type of double A-arm suspension configuration derived from Ford's Twin I-Beam front suspension system. In connection with our investigation of the suspension concept, we sought a means of transmitting power from a powertrain to the wheels. In order to accommodate the long travel and articulation capabilities of the concept's link configuration, we developed a drivetrain comprised of unique gearboxes and differential housing assemblies. A preliminary draft of the drivetrain is disclosed in U.S. patent application Ser. No. 14/087,552, the application being filed on Dec. 26, 2013.

Given the upper and lower leading links included in the suspension system disclosed in patent application Ser. No. 14/059,062, the drivetrain in the draft is based on a design that involves a means for receiving power at the one frame side and then delivering that power to the wheel opposite the one frame side, the one frame side serving to locate the first ends of the upper and lower leading links. The means refers to a type of gearbox that cooperates with one and the other axle shafts whereby the first and second ends on the other axle shaft are aligned with those on the upper and lower leading links: the one axle shaft transmits power from the differential housing to the gearbox; then the other axle shaft transmits power from the gearbox to the wheel opposite the one frame side, the transmission of power is enabled by the alignment.

Reported herein is an elaboration of the draft. The draft defines elements of the drivetrain, the elements include reverse power couplers, an offset power coupler, and differential housing assemblies. The report covers the elements and discloses the transmission of power from a powertrain to the wheels; and in particular defines the mechanisms by which power is transmitted within an element and from one element to another, the mechanisms of which are absent in both the draft and art.

BRIEF SUMMARY OF THE INVENTION

The present invention represents a drivetrain which integrates the elements disclosed in a prior application with the mechanisms of power transmission. Elements include reverse power couplers, an offset power coupler, differential housing assemblies, and axle shafts. The reverse power coupler and offset power coupler are each a type of gearbox comprised of internal and external components. Operable interactions of the internal components enable power to be transmitted from one element to another. The differential housing assemblies serve to position the differential housings in the frame. The axle shafts serve as conduits for passing power from one element to another.

The present invention also represents a drivetrain that:

is specifically designed to operate in conjunction with the suspension system disclosed in U.S. patent application Ser. No. 14/059,062;

expounds on the drivetrain disclosed in U.S. patent application Ser. No. 14/087,552, the application being the parent of the present invention;

possesses frame-mounted reverse power couplers. Each coupler comprises internal and external components: the internal components include chains, gears, and input and output shafts; while the external components include the input and output shafts and upper and lower leading link mounting brackets whereby the shafts protrude out of the gearbox such that the shafts and mounting brackets occupy the same side of the gearbox. Each coupler is fabricated in a manner such that it is an integral part of the front and rear ends of each frame side, the internal components being located inside the frame side;

possesses an offset power coupler. The coupler comprises internal and external components: the internal components include chains, gears, and input and output shafts; while the external components include the input and output shafts whereby the shafts protrude out of the gearbox such that they occupy opposite sides of the gearbox. The offset power coupler is directly connected to the front differential housing by adapting the output shaft to the pinion shaft of the front differential housing. The connection enables the input shaft to be aligned with the first output shaft of the transfer case whereby the alignment minimizes the angulation of the flexible joints on the front drive shaft thereby facilitating the smooth, efficient, and vibration-free transmission of power from the transfer case to the offset power coupler;

possesses differential housing assemblies whereby each assembly consists of a differential housing, mounting brackets, and CV-joint flanges. The CV-joint flanges serve as the connection locations between the differential housing and short axle shafts. The mounting brackets act to secure the differential housing to the front and rear ends of the frame, and are oriented so as to position the differential housing mid-way between the driver and passenger reverse power couplers and to facilitate suspension travel during compression;

possesses axle shafts. A driver short axle shaft transmits power from the front or rear differential housing to the driver reverse power coupler while a passenger long axle shaft transmits power from the driver reverse power coupler to the passenger front or rear wheel, the driver reverse power coupler is located at the front or rear end of driver frame side, respectively. Likewise, a passenger short axle shaft transmits power from the front or rear differential housing to the passenger reverse power coupler while a driver long axle shaft transmits power from the passenger reverse power coupler to the driver front or rear wheel, the passenger reverse power coupler is located at the front or rear end of the passenger frame side, respectively;

cooperatively interacts with the link configuration of the suspension system. The cooperation is based on the correspondence between the layout of the axle shafts and link configuration; a key feature of the cooperation is the use of long axle shafts with a proper length and of a vertical orientation of the input and output shafts and upper and lower leading link mounting brackets on the reverse power coupler; the key feature enables the flexible joints on one and a second ends of the long axle shaft to be coincident with those on the one ends of the upper and lower leading links and ball joints attached to the top and bottom of the knuckle, respectively, throughout the entire range of suspension travel;

minimizes un-sprung weight by directly or indirectly mounting the drivetrain components to the frame thereby ensuring that the suspension system retains the handling quality like an independent suspension system.

BRIEF DESCRIPTION OF THE SEVERAL VIEWS OF THE DRAWING

Brief Description of the Drawings

Figure 1:
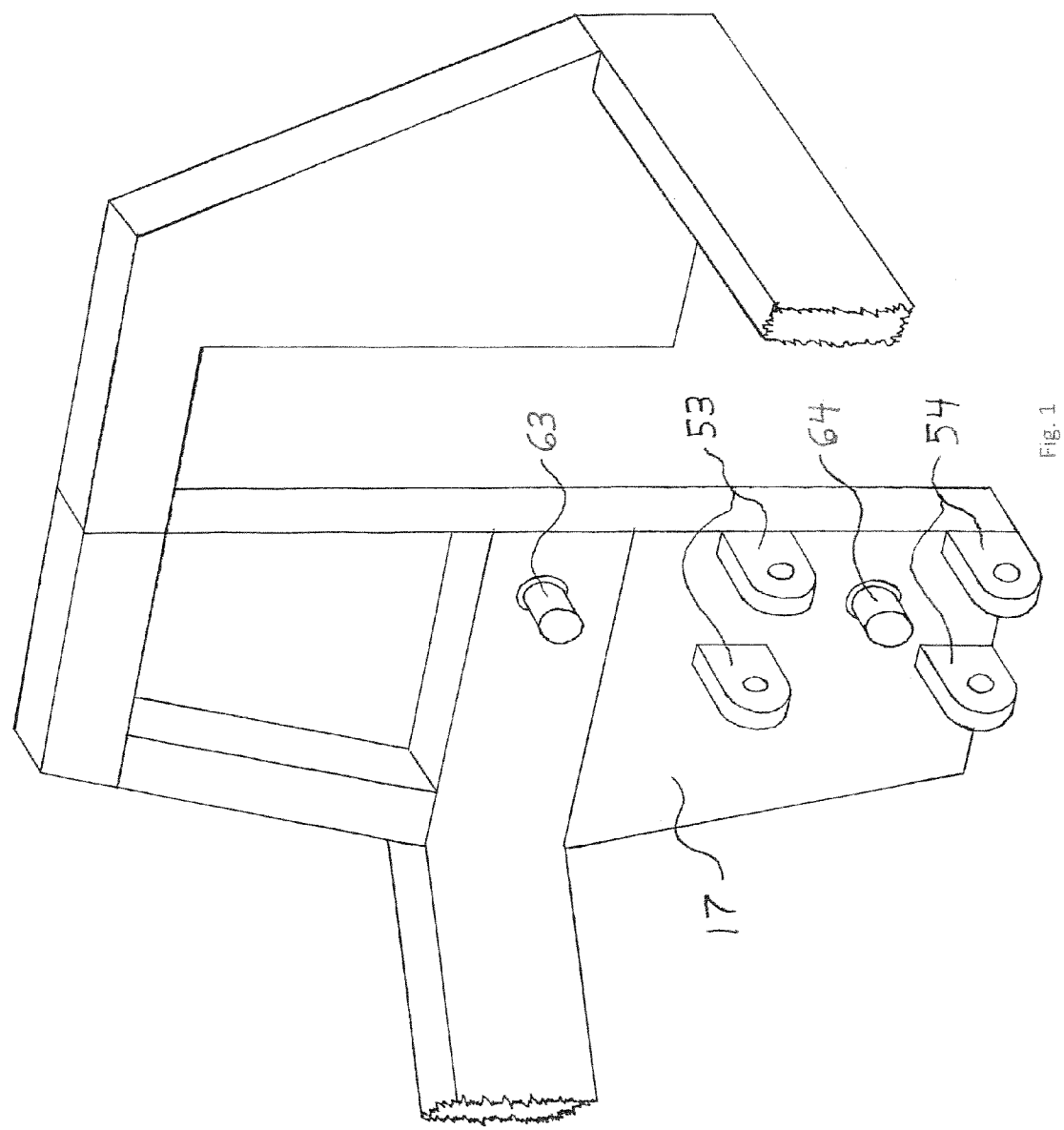
Figure 2:
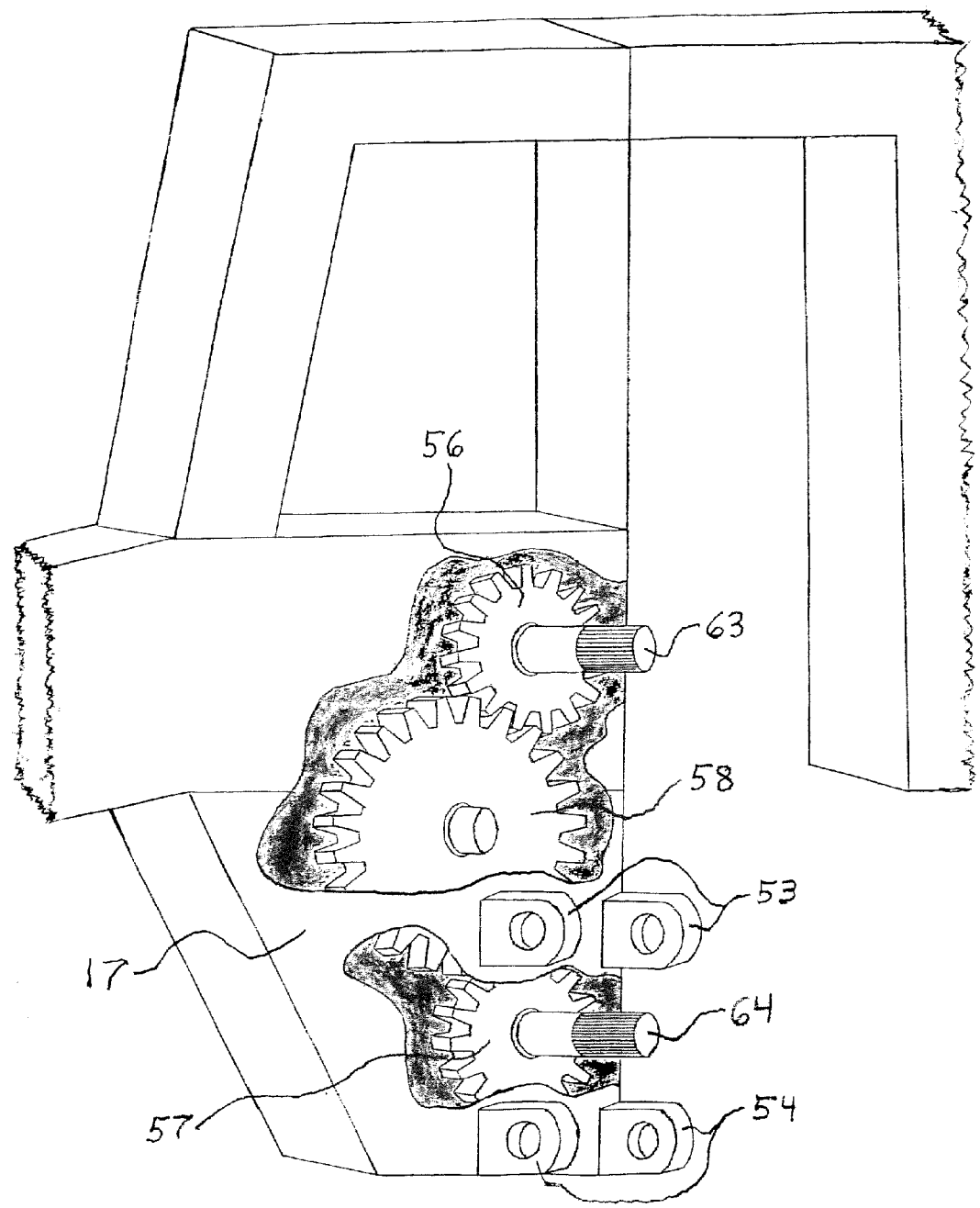
Figure 3:
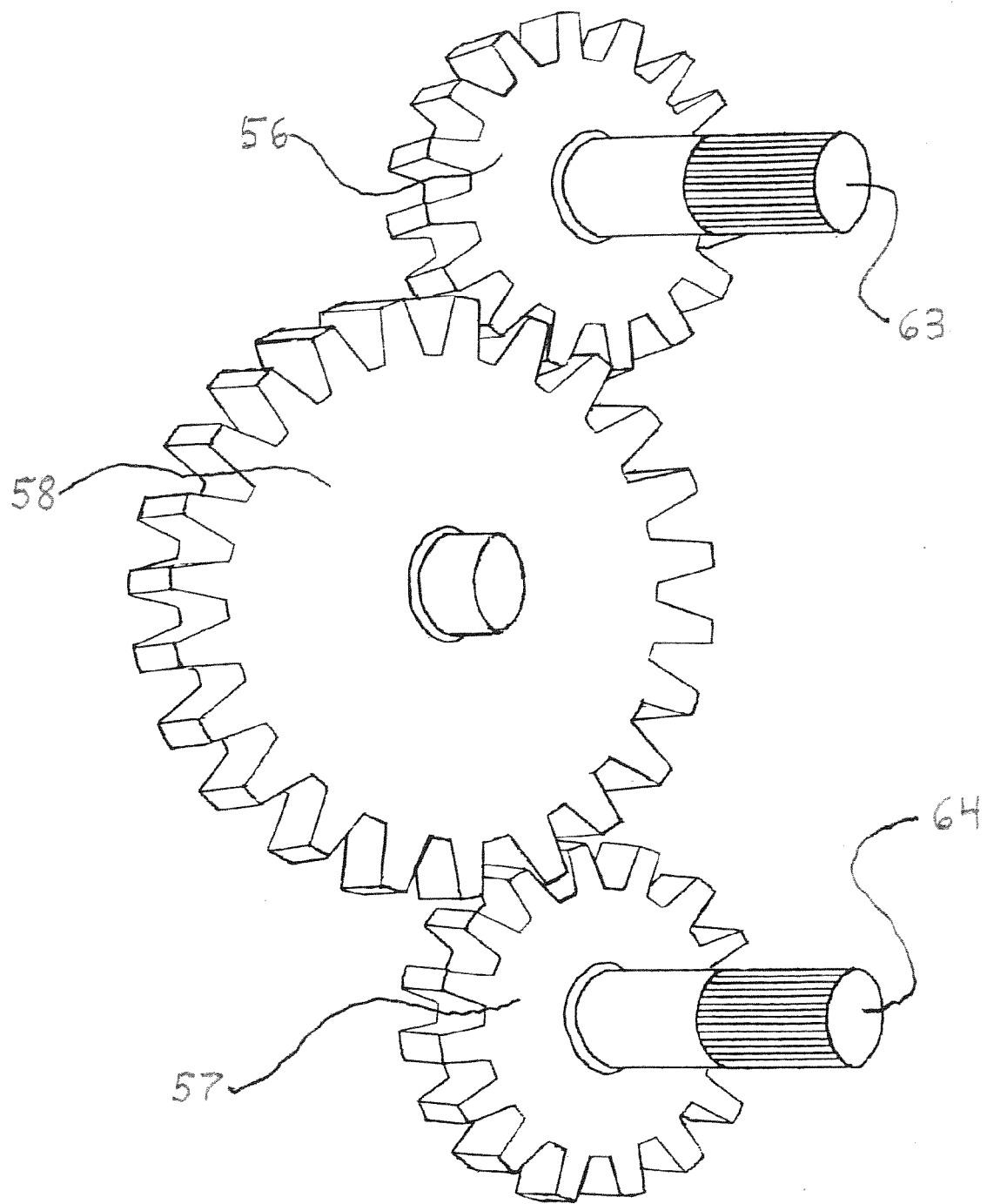
Figure 4:
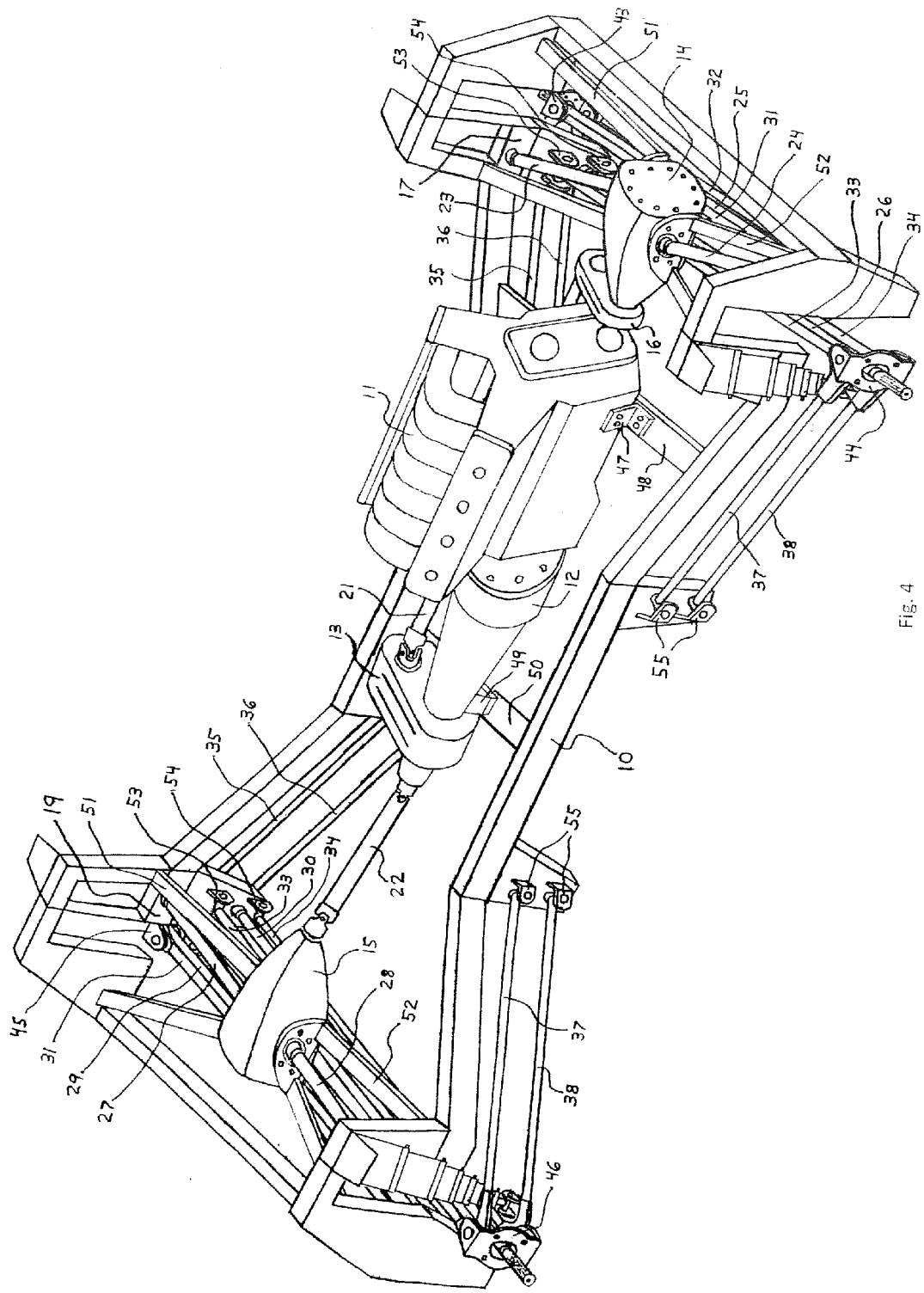
Figure 5:
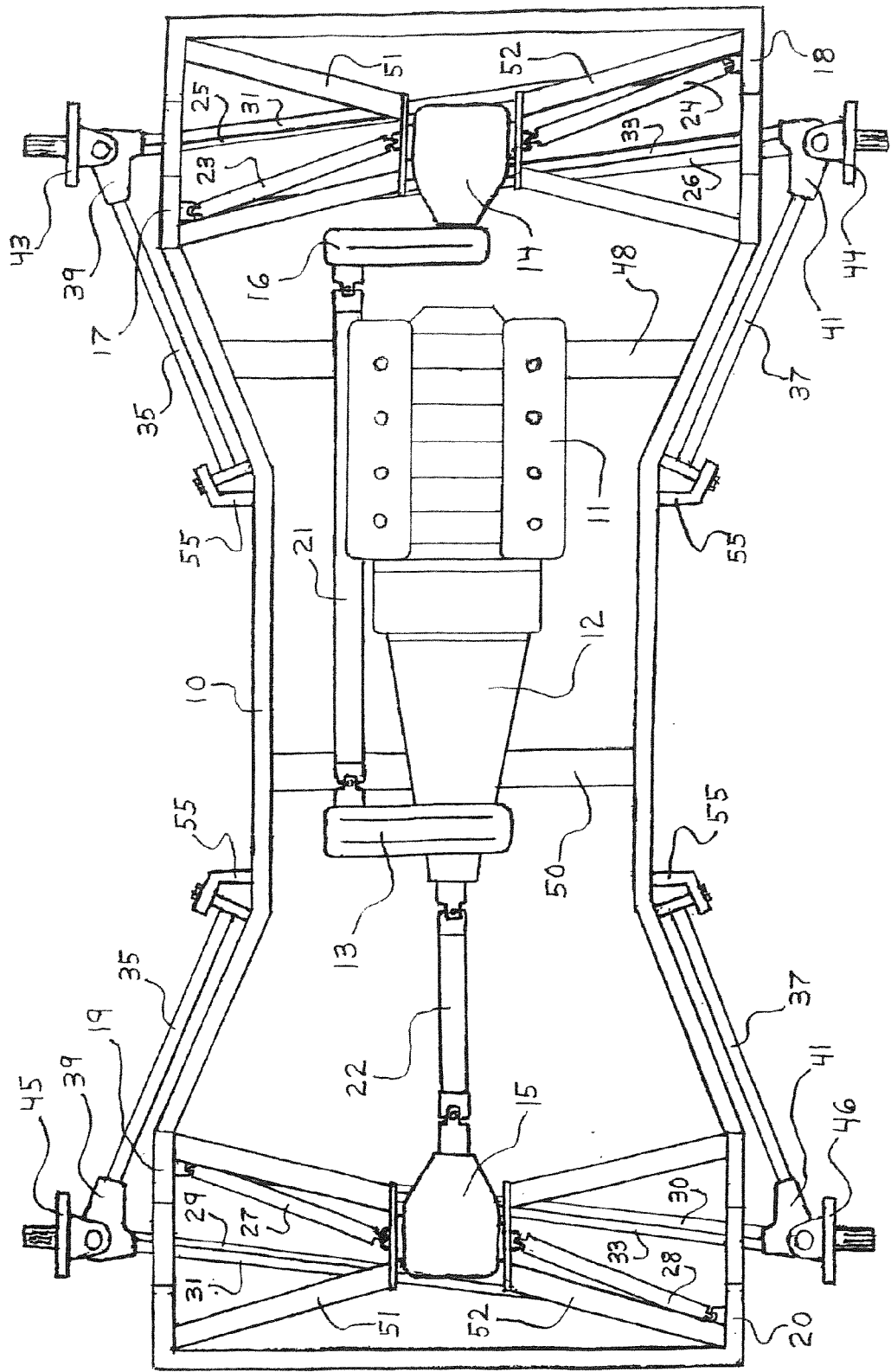
Figure 6:
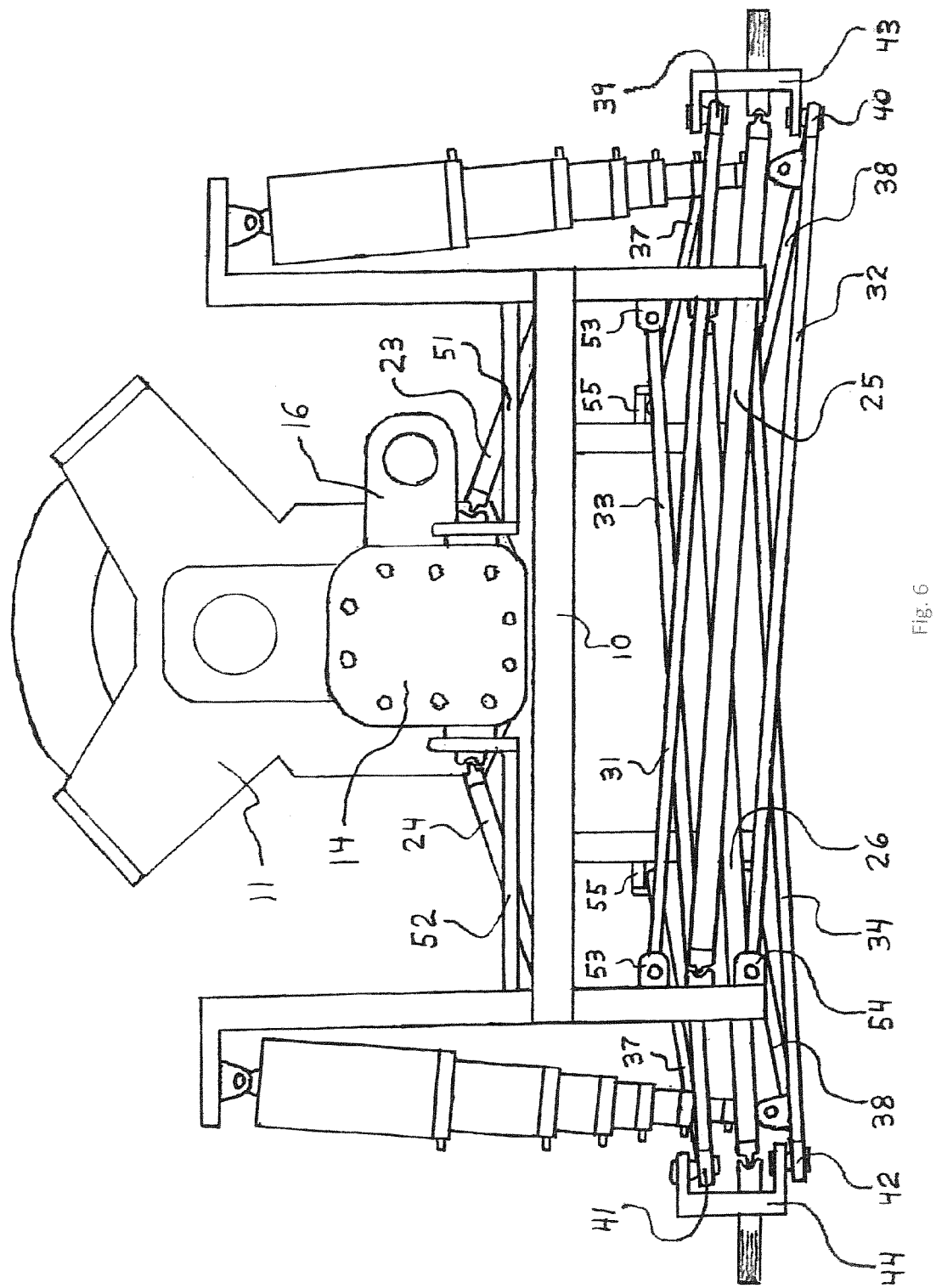
Figure 7:
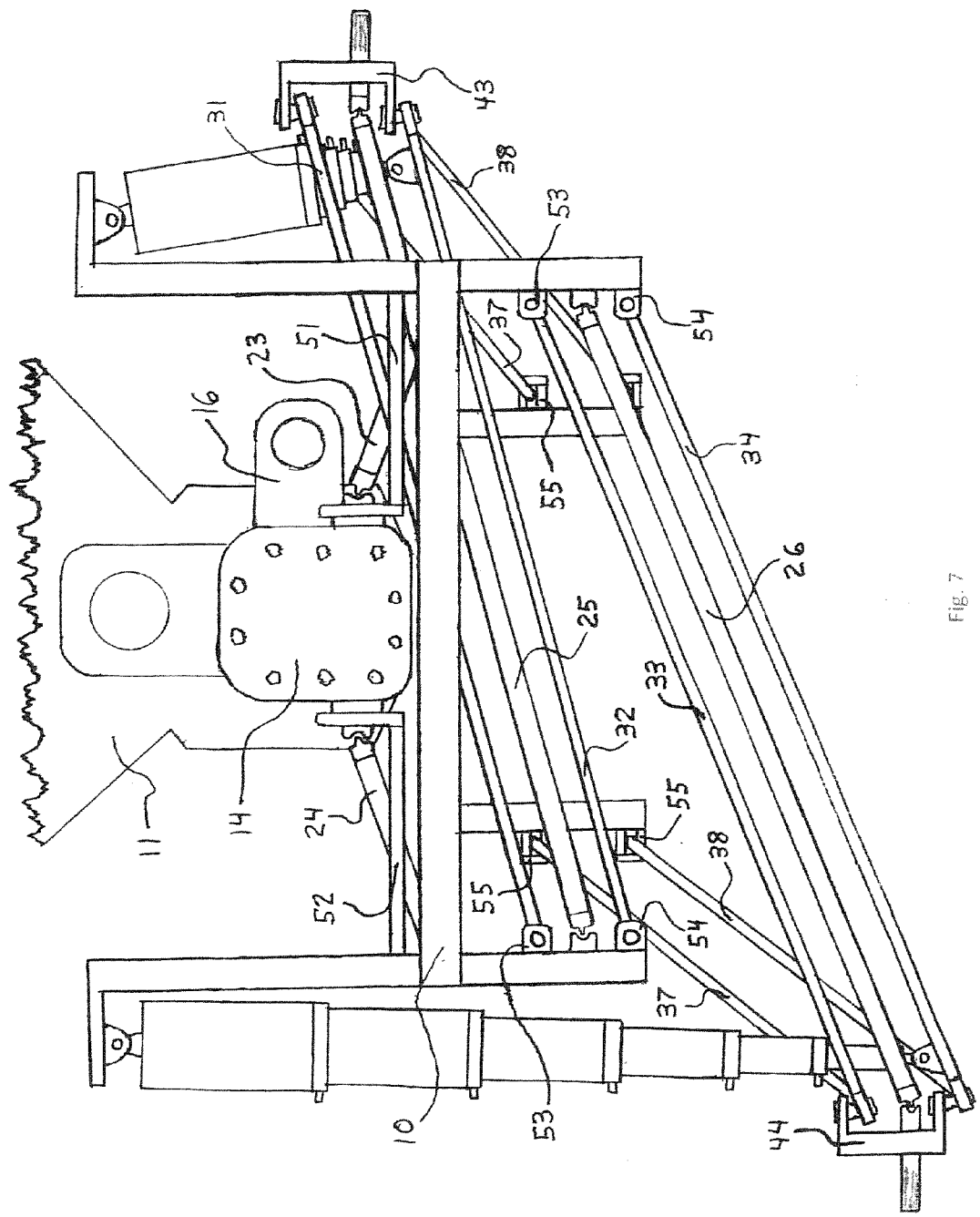
Figure 8:
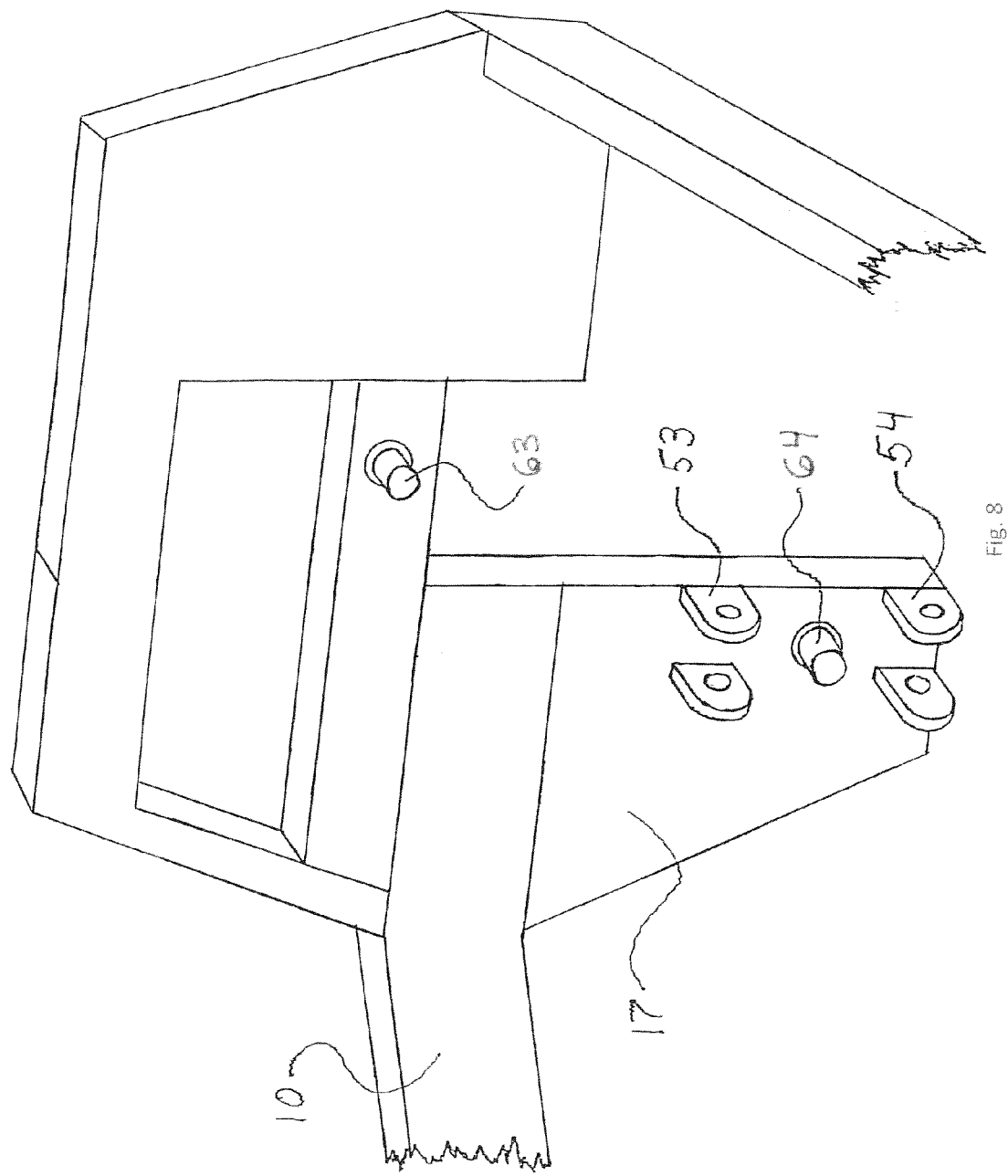
Figure 9:
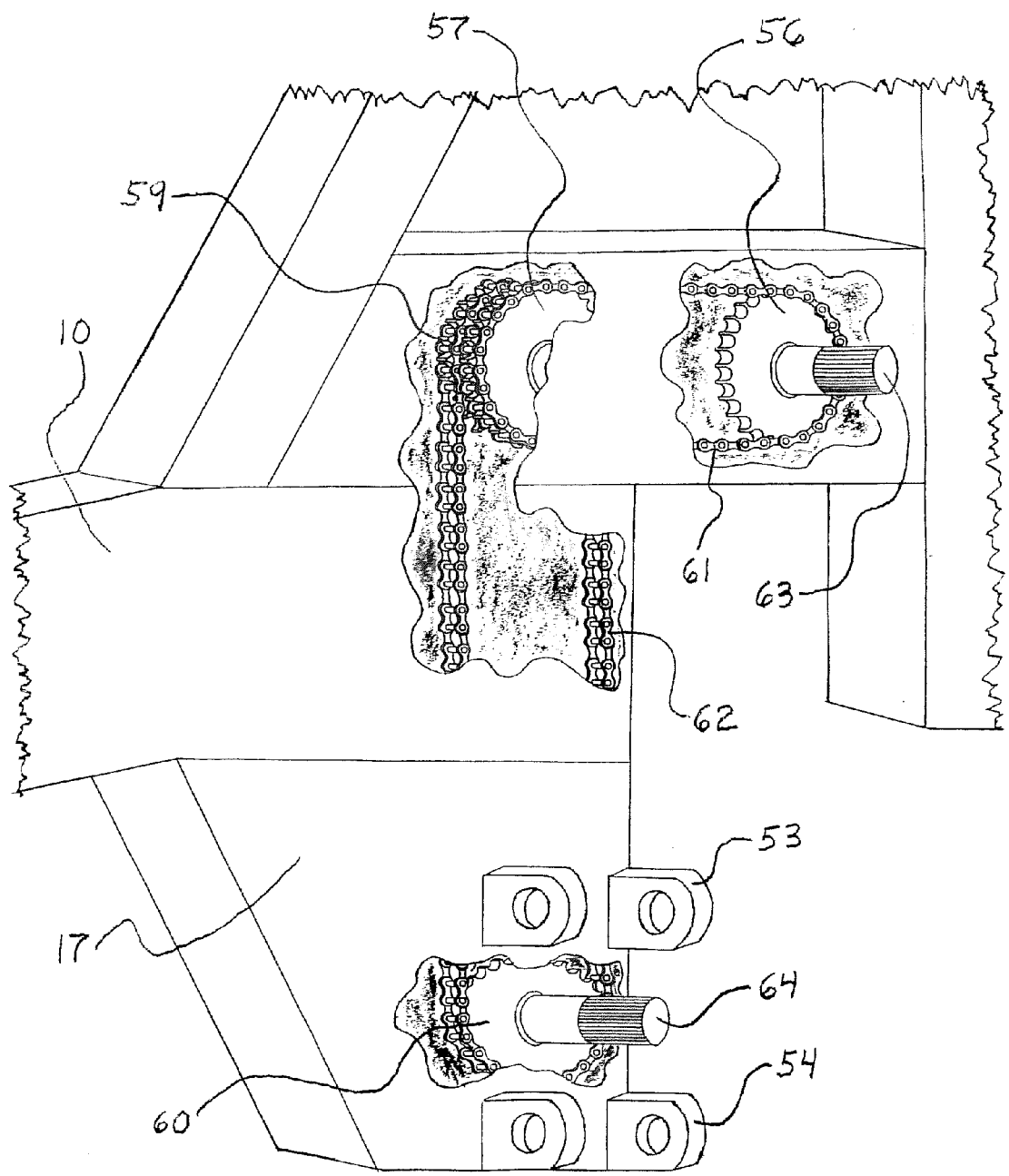
Figure 10:
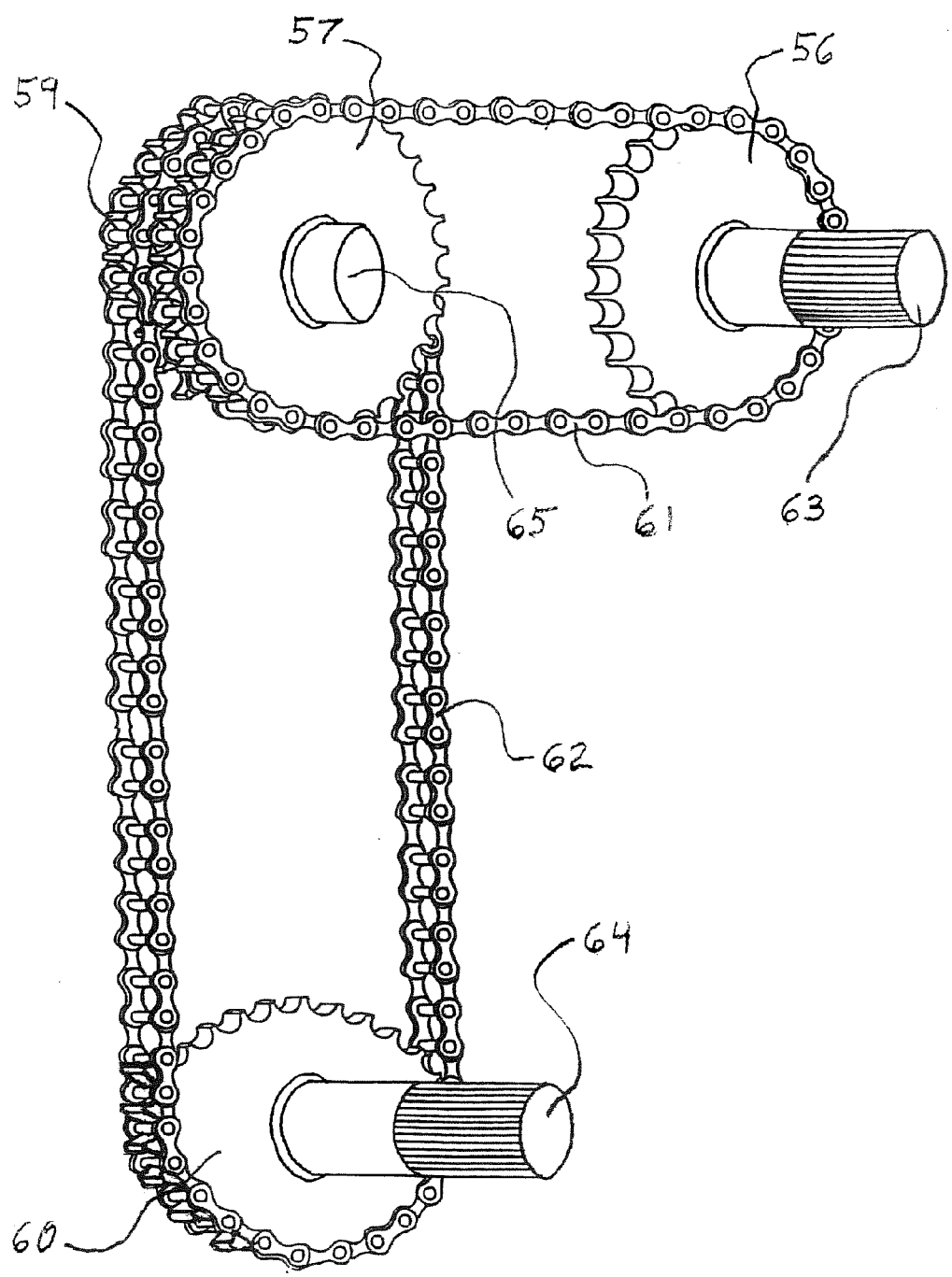
Figure 11:
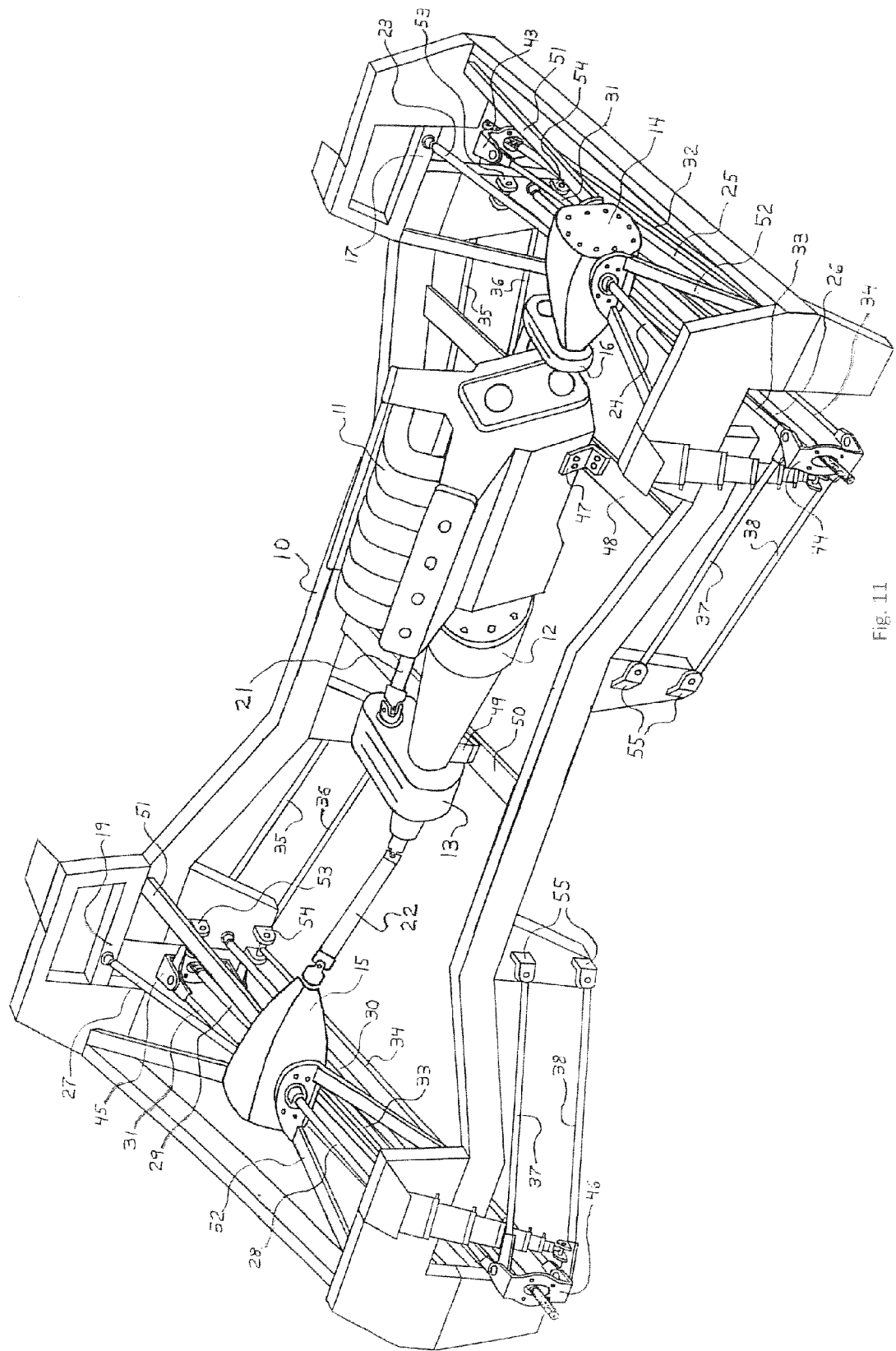
Figure 12:
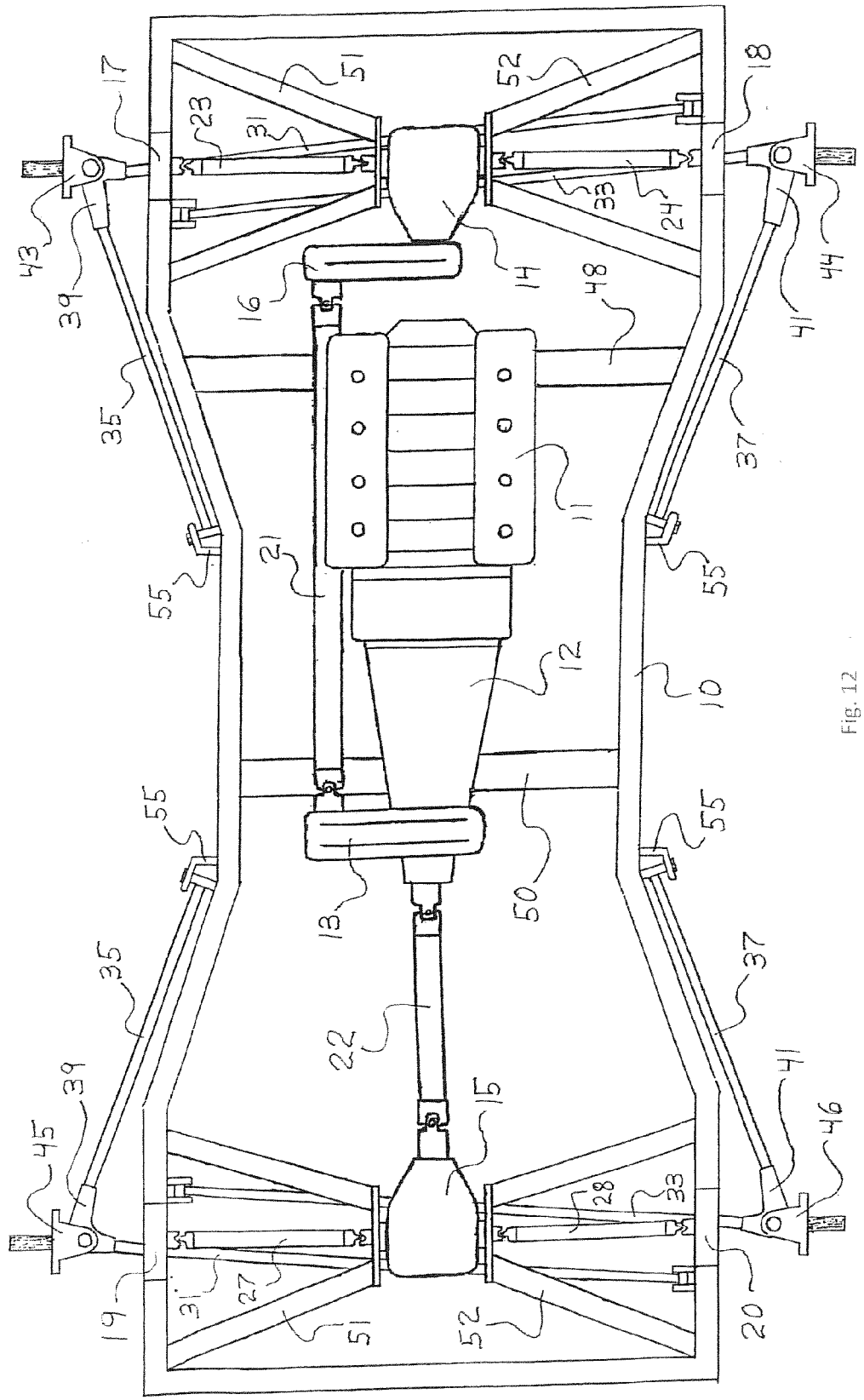
Figure 13:
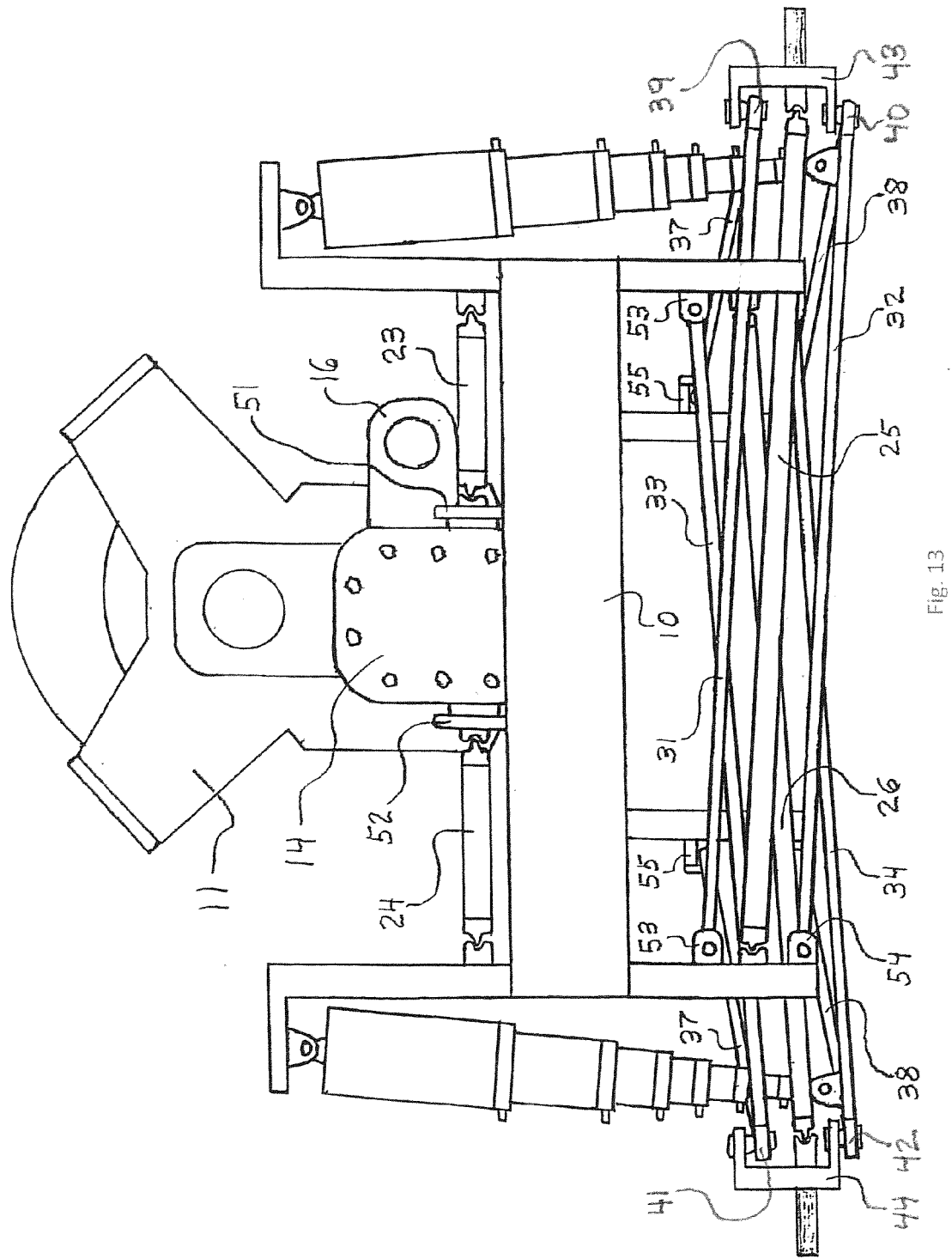
Figure 14:
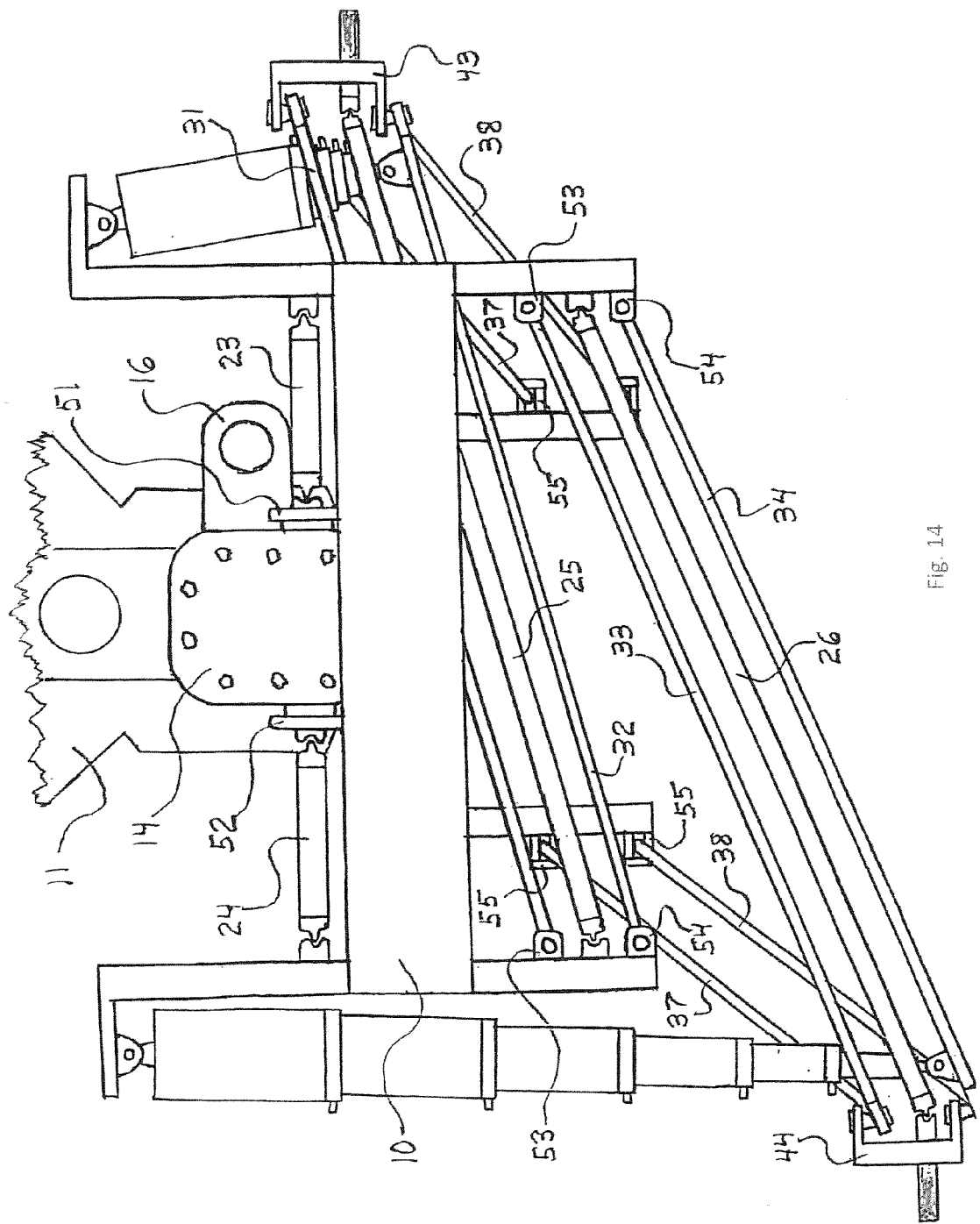
Figure 15:
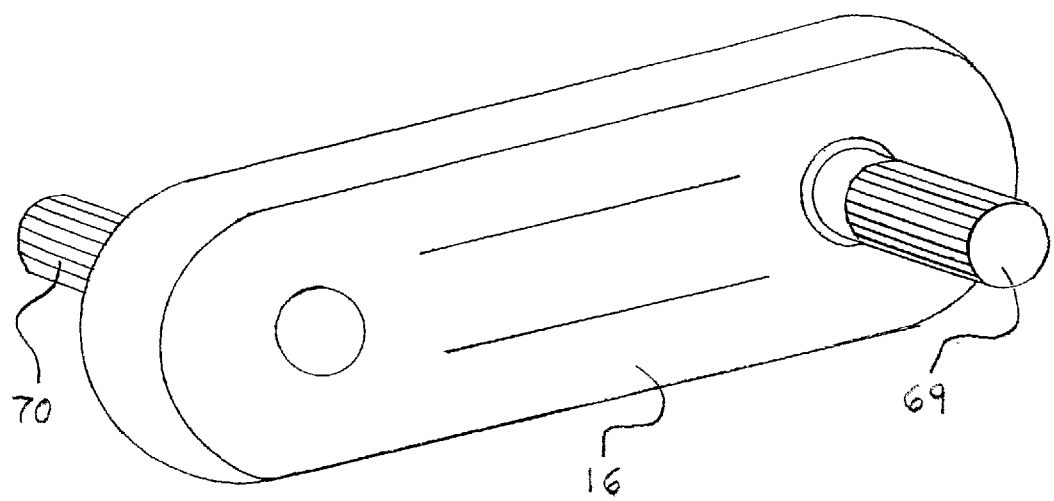
Figure 16:
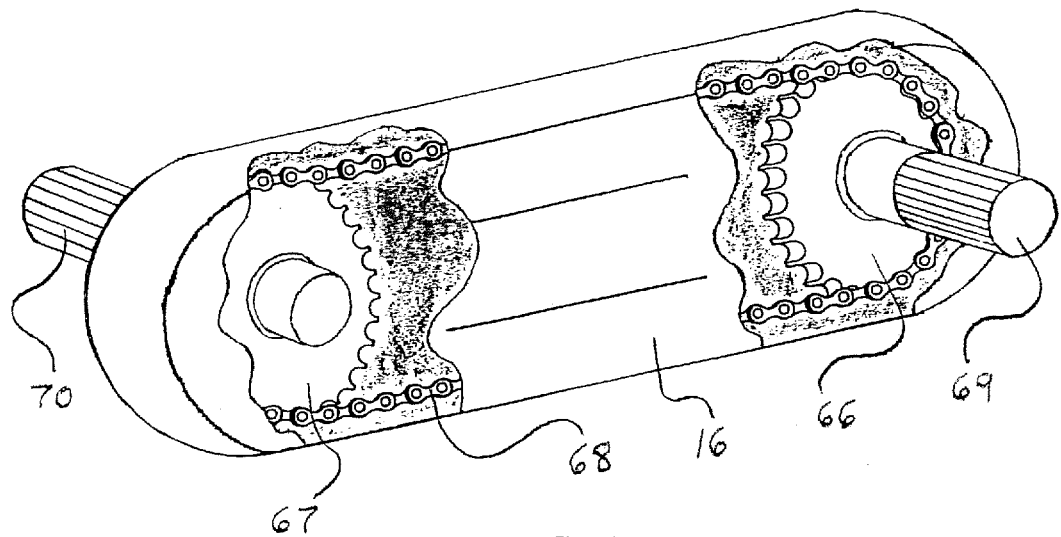
Figure 17:
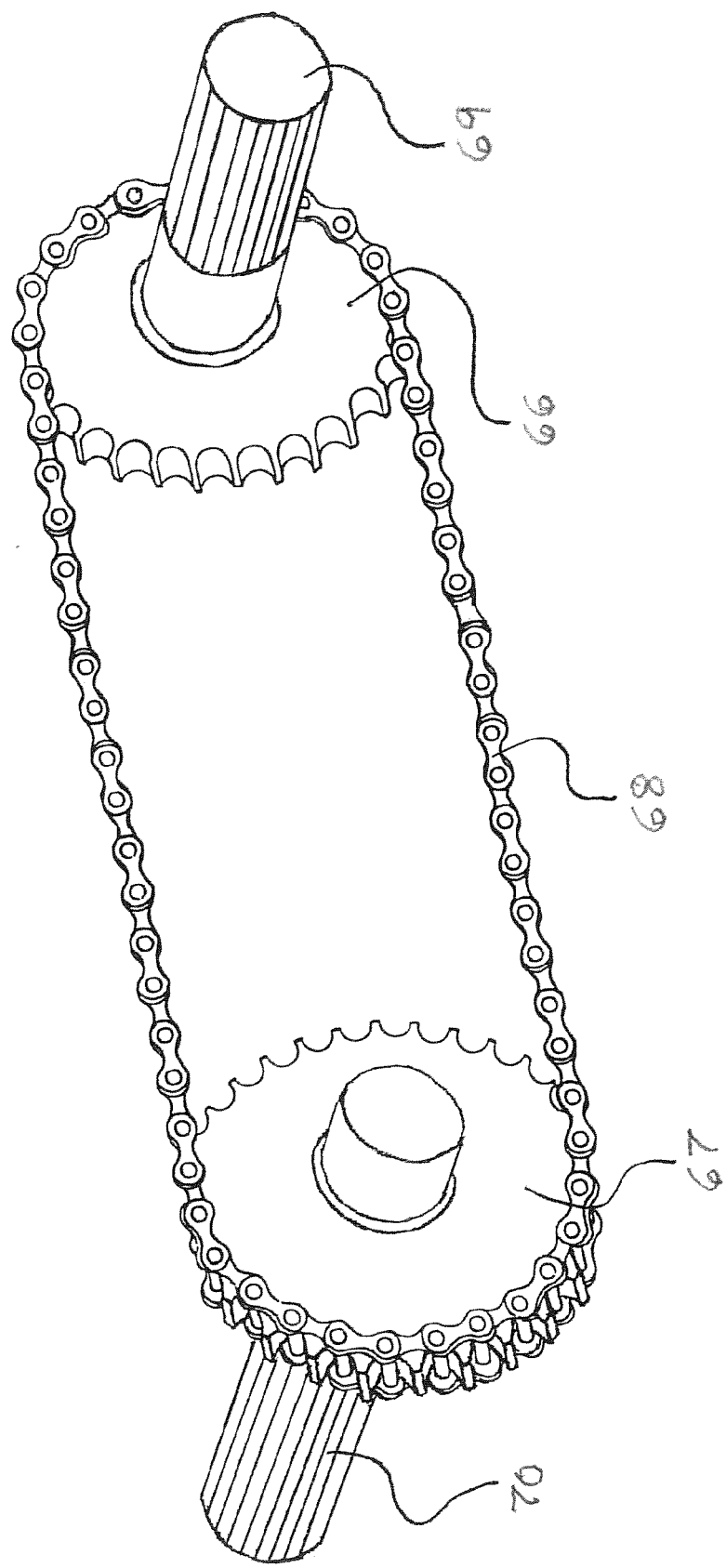
Figure 18:
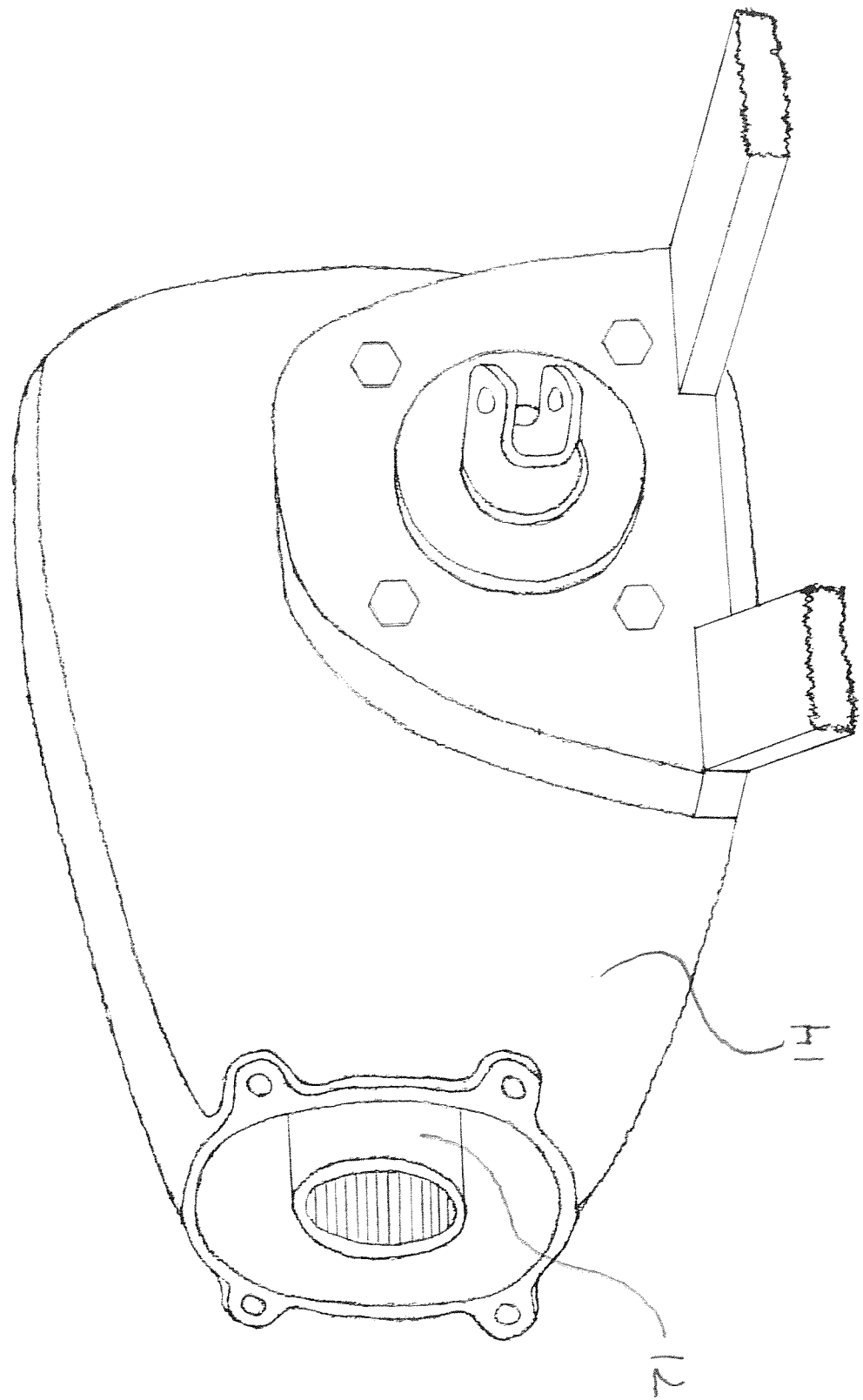
Figure 19:
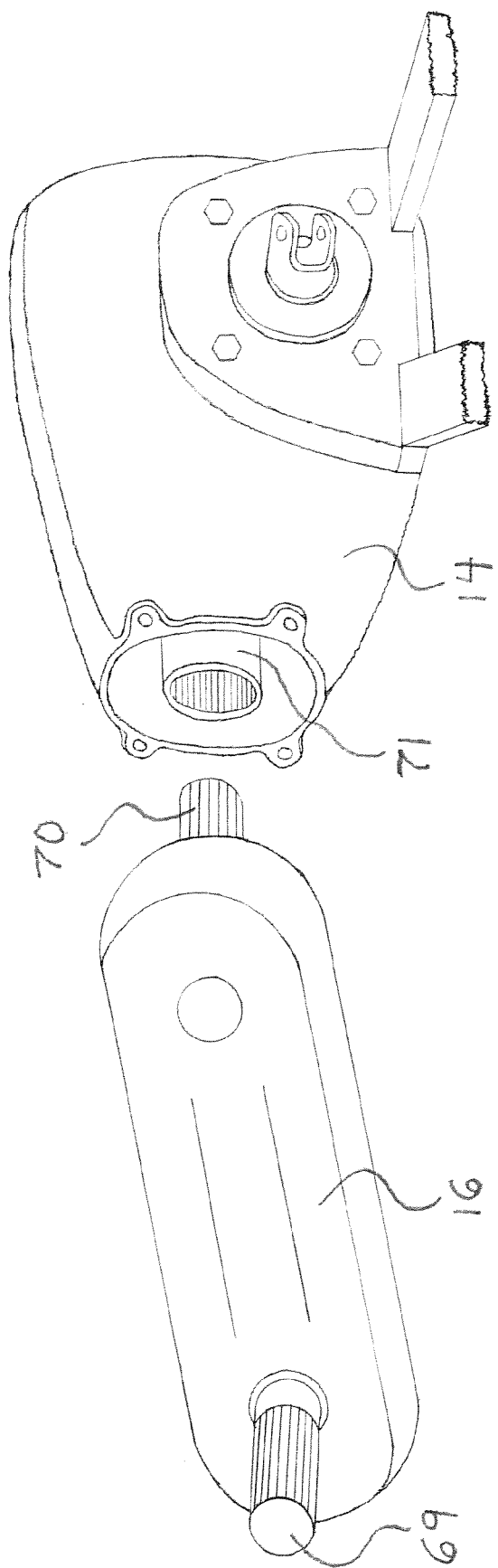
Figure 20:
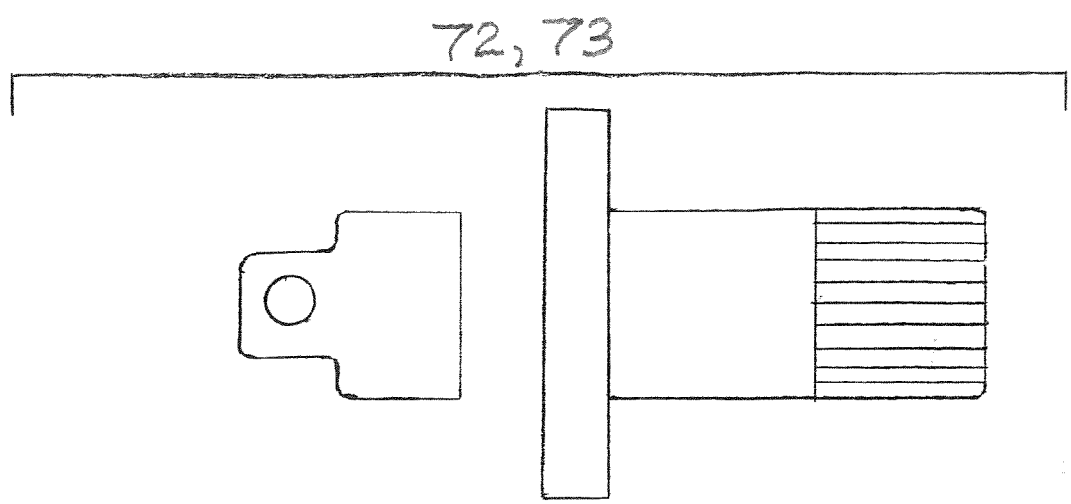
Figure 21:
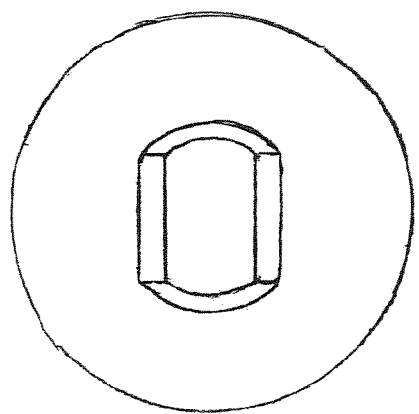
Figure 22:
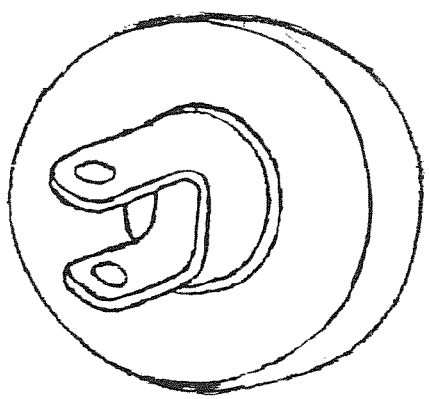
Figure 23:
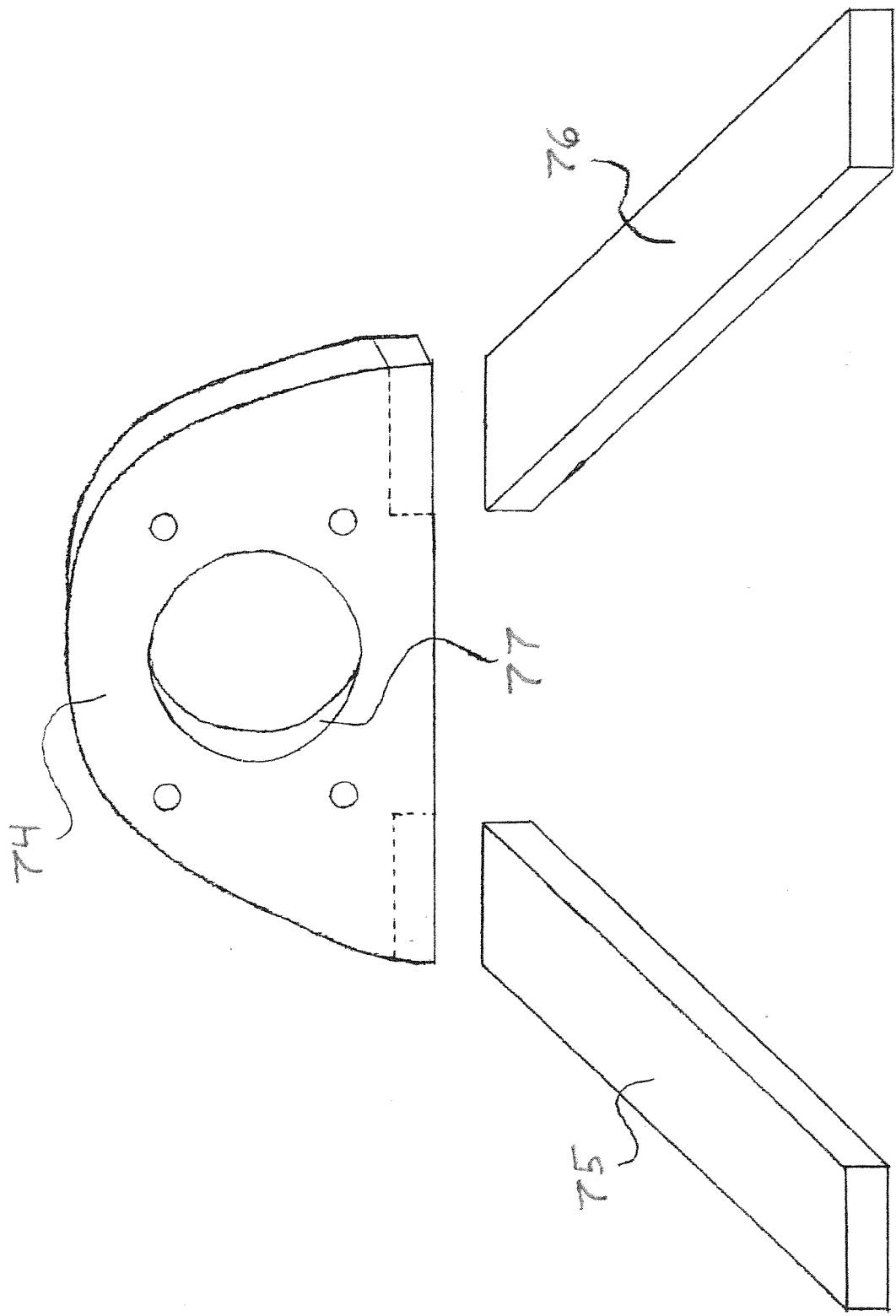
Figure 24:
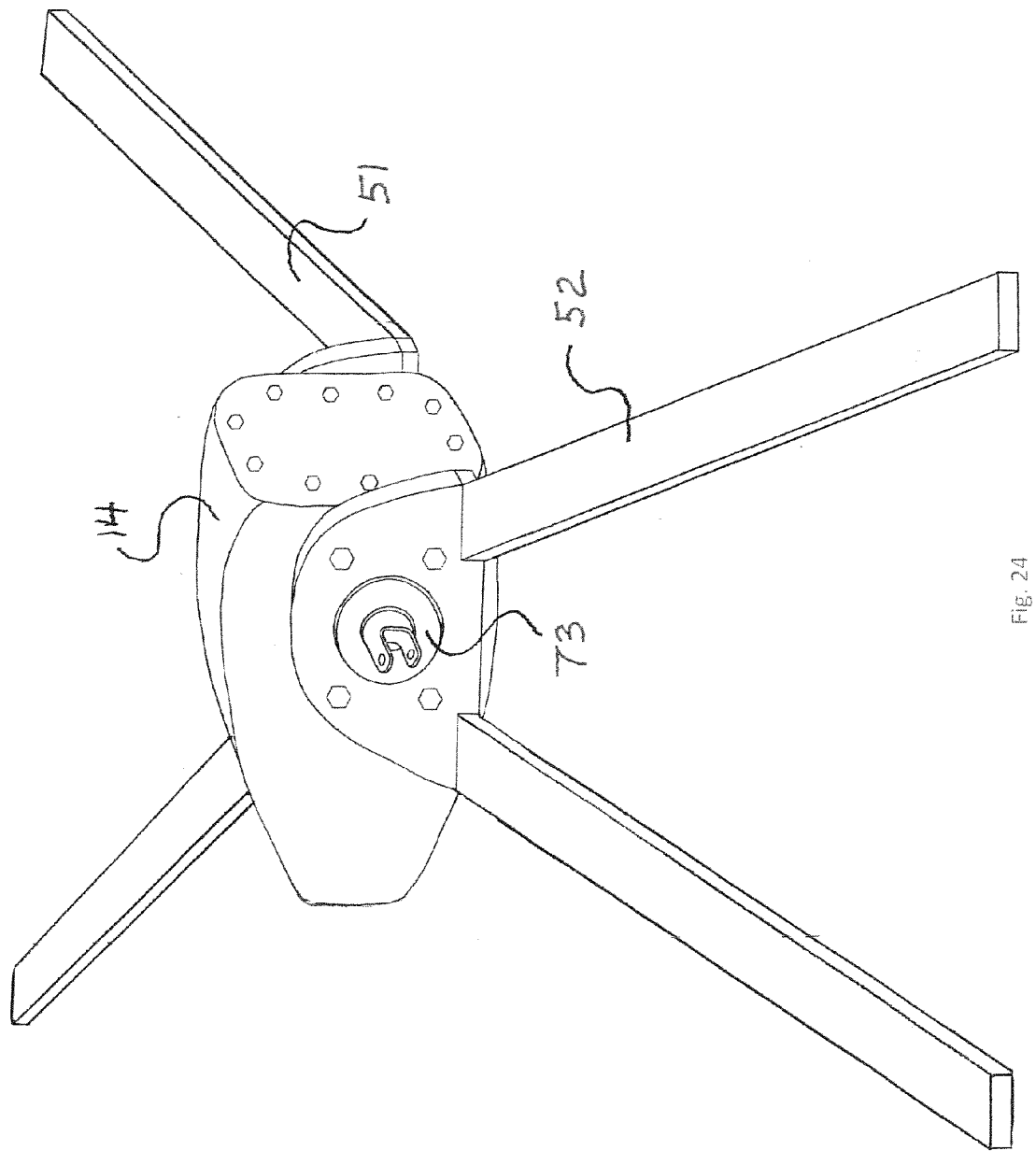
Figure 25:
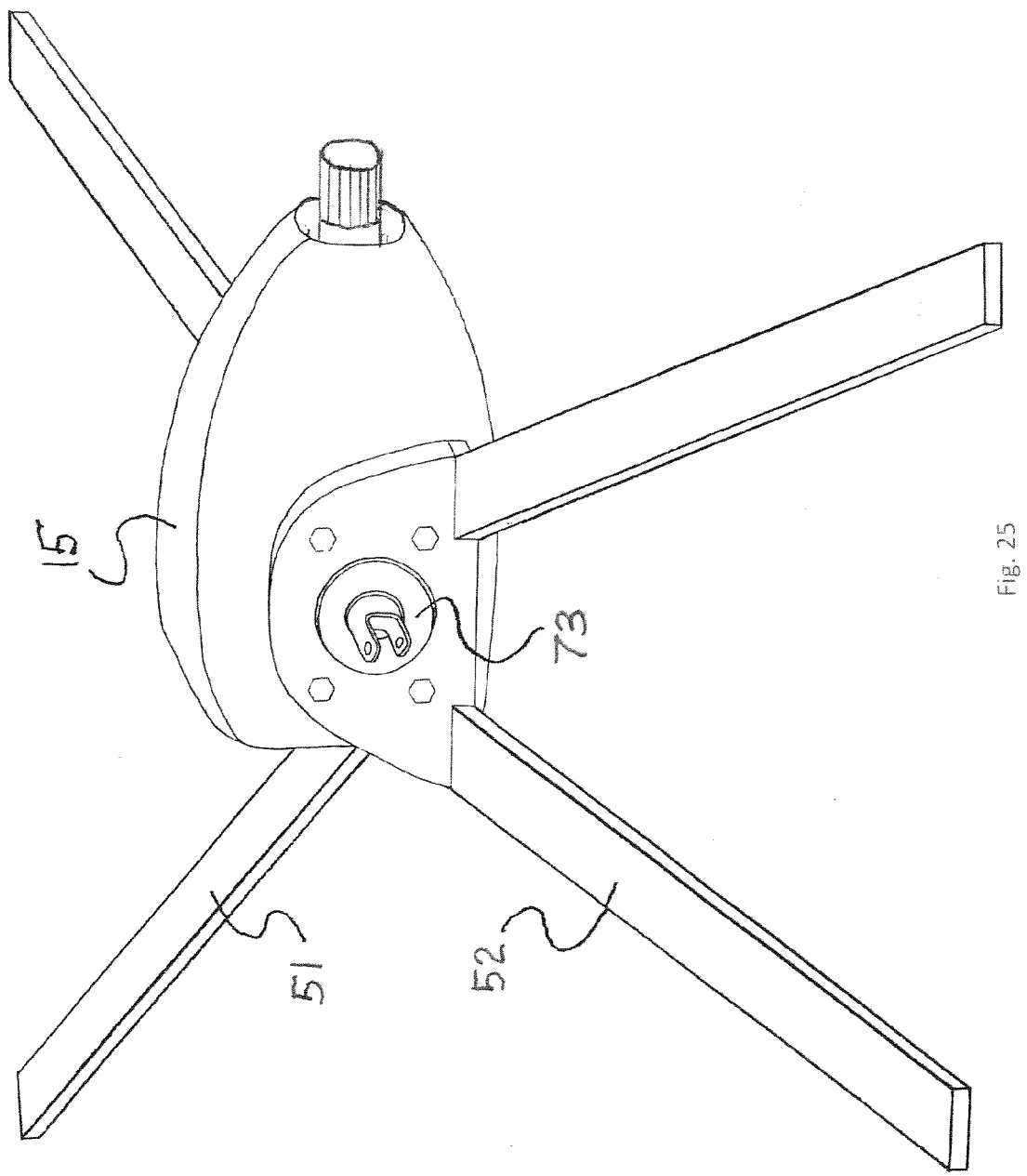

FIG. 1 is a front side perspective view of one version of the front driver reverse power coupler;

FIG. 2 is a front side cut-away view of one version of the front driver reverse power coupler;

FIG. 3 is a front side view of the internal components for one version of the reverse power coupler;

FIG. 4 and is a front side perspective view of the one version of the drivetrain and the suspension system for a 4WD vehicle, and is the same as FIG. 1 in parent application;

FIG. 5 is a top plan view thereof, and is the same as FIG. 2 in parent application;

FIG. 6 is a front view of the front suspension system at ride height and one version of the drivetrain thereof, and is the same as FIG. 3 in parent application;

FIG. 7 is a front view of the front suspension system articulated and second version of the drivetrain thereof, and is the same as FIG. 4 in parent application;

FIG. 8 is a front side perspective view of a second version of the front driver reverse power coupler;

FIG. 9 is a front side cut-away view of a second version of the front driver reverse power coupler;

FIG. 10 is a front side view of the internal components for a second version of the reverse power coupler;

FIG. 11 is a front side perspective view of the second version of the drivetrain and the suspension system for a 4WD vehicle;

FIG. 12 is a top plan view thereof;

FIG. 13 is a front view of the front suspension system at ride height and second version of the drivetrain thereof;

FIG. 14 is a front view of the front suspension system articulated and second version of the drivetrain thereof;

FIG. 15 is a front side perspective view of the offset power coupler;

FIG. 16 is a front side perspective view of the cut-away offset power coupler;

FIG. 17 is a front side perspective view of the internal components for an offset power coupler;

FIG. 18 is a rear side perspective view of the front differential housing;

FIG. 19 is a perspective view of the adaptation between the output shaft of the offset power coupler and pinion shaft of the front differential housing;

FIG. 20 is a side view of the parts to the driver or passenger CV-joint flange;

FIG. 21 is a top view of the driver or passenger CV-joint flange;

FIG. 22 is a side perspective view of the driver or passenger CV-joint flange;

FIG. 23 is a perspective view of the parts to the differential housing mounting bracket;

FIG. 24 is a passenger side perspective view of the front differential housing assembly;

FIG. 25 is a passenger side perspective view of the rear differential housing assembly.

DETAILED DESCRIPTION OF THE INVENTION

The present invention is directed to a drivetrain which is operably installed with the front and rear independent suspension systems disclosed in U.S. patent application Ser. No. 14/059,062, each suspension system is based on a type of double A-arm suspension configuration derived from Ford's Twin I-Beam front suspension system. Reported herein is the integration of the elements disclosed in U.S. patent application Ser. No. 14/087,552 with novel mechanistic features that define power transmission within and among those elements, the application being filed on Dec. 26, 2013.

Referring now to the drawings, a drivetrain for a four-wheel drive vehicle is schematically shown: some of the drawings show the drivetrain installed within a frame 10 and interactively associated with a powertrain and suspension system while others show details of the drivetrain. Elements of the drivetrain includes the front driver and passenger reverse power couplers 17 and 18, rear driver and passenger reverse power couplers 19 and 20, offset power coupler 16, and front and rear differential housing assemblies. The powertrain includes an engine 11, transmission 12, and transfer case 13.

Each reverse or offset power coupler 17-20 or 16 is a gearbox comprised of internal and external components. The reverse power coupler 17-20 is a flexible gearbox. The components of the reverse power coupler 17-20 depend on the purpose of the reverse power coupler 17-20. Two possible versions of the reverse power coupler 17-20 are described below. The first version utilizes a design in which all components are located next to an aperture. This way, the size of the aperture can be large thereby optimizing suspension compression. The second version utilizes a design in which some of the components are located next to the aperture while an input shaft is located above the aperture. This way, the input shaft can be aligned with a CV-joint flange thereby optimizing efficient operation of a short axle shaft.

Components of the front or rear differential housing assembly include the front or rear differential housing 14 or 15, driver and passenger differential housing mounting brackets 51 and 52, and driver and passenger CV-joint flanges 72 and 73, respectively.

The means for transmitting power from one drivetrain or powertrain element to another include the front and rear drive shafts 21 and 22, front driver and passenger short axle shafts 23 and 24, front driver and passenger long axle shafts 25 and 26, rear driver and passenger short axle shafts 27 and 28, and rear driver and passenger long axle shafts 29 and 30, respectively. The layout of the axle shafts cooperates with the configuration of the suspension system. The configuration includes the driver upper and lower leading links 31 and 32, passenger upper and lower leading links 33 and 34, driver upper and lower trailing links 35 and 36, and passenger upper and lower trailing links 37 and 38, respectively. The layout and configuration comply with the structure of the frame 10. The frame 10 includes driver and passenger frame sides. Each frame side comprises two apertures whereby each aperture is a rectangular shaped open space that is fabricated into the front and rear ends of each frame side. The shape represents three straight edges—a horizontal edge and one and a second vertical edges. The horizontal edge is positioned at the top between one and the second vertical edges, the one vertical edge being closer to the front or rear end of each frame side than is the second vertical edge.

Referring to FIGS. 2 and 3, there is illustrated the internal components of one version of each reverse power coupler, each reverse power coupler being exemplified by the front driver reverse power coupler 17:

The internal components are able to be three gears, input shaft 63, and output shaft 64 whereby each gear has teeth. The first and second gears 56 and 57 are connected to the input and output shafts 63 and 64, respectively. The connection between the first gear 56 and input shaft 63 or second gear 57 and output shaft 64 enables the first gear 56 and input shaft 63 or second gear 57 and output shaft 64 to act as a single unit, respectively. Each unit and a third gear 58 are rotationally affixed to the inside of the gearbox. The rotational affixments of each unit and third gear 58 enable the teeth on the first and second gears 56 and 57 to contact those on the third gear 58. The contact of the teeth on the first or second gear 56 or 57 with those on the third gear 58 depicts a rotational interaction between the first or second gear 56 or 57 and third gear 58. The rotational interactions between the first and third gears 56 and 58 and between the second and third gears 57 and 58 enable power to be transmitted internally from the first gear 56 and input shaft 63 unit to the third gear 58, then from the third gear 58 to the second gear 57 and output shaft 64 unit; i.e., from the input shaft 63 to the output shaft 64.

Referring to FIGS. 9 and 10, there is illustrated the internal components of a second version of each reverse power coupler, each reverse power coupler being exemplified by the front driver reverse power coupler 17:

The internal components include horizontal and vertical gearsets, input shaft 63, output shaft 64, and connector shaft 65. Each gearset is comprised of a chain and two gears whereby each chain has links while each gear has teeth. The chain and two gears in the horizontal gearset are the one chain 61 and first and second gears 56 and 57 while the chain and two gears in the vertical gearset are the second chain 62 and top and bottom gears 59 and 60, respectively. The horizontal gearset is oriented horizontally while the vertical gearset is oriented vertically whereby the horizontal gearset is positioned above the vertical gearset such that the second gear 57 is next to the top gear 59. The first gear 56 is connected to the input shaft 63, the bottom gear 60 is connected to the output shaft 64, and the second gear 57 and top gear 59 are connected to the connector shaft 65. The connection between the first gear 56 and input shaft 63, bottom gear 60 and output shaft 64, or second gear 57, top gear 59, and connector shaft 65 enables the first gear 56 and input shaft 63, bottom gear 60 and output shaft 64, or second gear 57, top gear 59, and connector shaft 65 to act as a single unit, respectively. The horizontal gearset includes the first gear 56 and input shaft 63 unit and second gear 57, top gear 59, and connector shaft 65 unit while the vertical gearset includes the second gear 57, top gear 59, and connector shaft 65 unit and bottom gear 60 and output shaft 64 unit. Each unit is rotationally affixed to the inside of the gearbox. The first gear 57 and input shaft 63 unit is spatially separated from the second gear 57, top gear 59, and connector shaft 65 unit such that the teeth on the first gear 56 do not contact those on the second gear 57 while the one chain 61 is positioned around the first and second gears 56 and 57 such that the links on the one chain 61 are able to contact the teeth on the first and second gears 56 and 57. The second gear 57, top gear 59, and connector shaft 65 unit is spatially separated from the bottom gear 60 and output shaft 64 unit such that the teeth on the top gear 59 do not contact those on the bottom gear 60 while the second chain 62 is positioned around the top and bottom gears 59 and 60 such that the links on the second chain 62 are able to contact the teeth on the top and bottom gears 59 and 60. The contact between the links on the one chain 61 and teeth on the first and second gears 56 and 57 depicts a rotational interaction between the one chain 61 and first and second gears 56 and 57 while the contact between the links on the second chain 62 and teeth on the top and bottom gears 59 and 60 depicts a rotational interaction between the second chain 62 and top and bottom gears 59 and 60. The rotational interactions between the one chain 61 and first and second gears 56 and 57 and between the second chain 62 and top and bottom gears 59 and 60 enable power to be transmitted internally from the first gear 56 and input shaft 63 unit to the second gear 57, top gear 59, and connector shaft 65 unit, then from the second gear 57, top gear 59, and connector shaft 65 unit to the bottom gear 60 and output shaft 64 unit; i.e., from the input shaft 63 to the output shaft 64.

Referring to FIGS. 1 and 8, there is illustrated the external components of each reverse power coupler, each reverse power coupler being exemplified by the front driver reverse power coupler 17:

The external components include the input and output shafts 63 and 64 and upper and lower leading link mounting brackets 53 and 54. The input and output shafts 63 and 64 protrude out of the gearbox while the upper and lower leading link mounting brackets 53 and 54 are affixed to an outer surface of the gearbox. All external components are positioned on the same side of the gearbox.

Referring to FIGS. 4-7 and 11-14, there is illustrated the location of each reverse power coupler:

The front driver or passenger reverse power coupler 17 or 18 is incorporated into the front driver or passenger frame side proximate the front driver or passenger wheel (not shown) in a manner such that the front driver or passenger reverse power coupler 17 or 18 is an integral part of the front driver or passenger frame side while the rear driver or passenger reverse power coupler 19 or 20 is incorporated into the rear driver or passenger frame side proximate the rear driver or passenger wheel (not shown) in a manner such that the rear driver or passenger reverse power coupler 19 or 20 is an integral part of the rear driver or passenger frame side whereby the internal components are located inside the frame side, respectively.

Referring to FIGS. 2 and 3, there is illustrated the incorporation of the components of the one version of each reverse power coupler, each reverse power coupler being exemplified by the front driver reverse power coupler 17:

The incorporation is implemented in a manner such that the internal and external components are positioned either next to the second vertical edge of the aperture on the driver frame side in a vertical orientation or next to the one vertical edge of the aperture on the passenger frame side in a vertical orientation. The vertical orientation of the external components in descending order is the input shaft 63 is the top component, followed by the upper leading link mounting bracket 53, then the output shaft 64, and then the lower leading link mounting bracket 54 is the bottom component.

Each shaft 63 or 64 and mounting bracket 53 or 54 project inward towards the engine bay.

The vertical orientation of the external components replicates the manner in which the upper and lower leading link mounting brackets 53 and 54 are affixed to the frame sides in the suspension system disclosed in the patent application Ser. No. 14/059,062, that manner being a vertical top and bottom orientation of the upper and lower leading link mounting brackets 53 and 54, respectively. Travel of the links is aided with the aperture. The aperture is fabricated: (a) into the front end of the driver or passenger frame side in a manner such that the front driver or passenger upper and lower leading links 31 and 32 or 33 and 34 and front driver or passenger long axle shaft 25 or 26 can travel upward into the aperture, and (b) into the rear end of the driver or passenger frame side in a manner such that the rear driver or passenger upper and lower leading links 31 and 32 or 33 and 34 and rear driver or passenger long axle shaft 29 or 30 can travel upward into the aperture, respectively. Upward travel occurs during suspension compression and acts to enhance the travel capability of the suspension system.

Referring to FIGS. 9 and 10, there is illustrated the incorporation of the components of the second version of each reverse power coupler, each reverse power coupler being exemplified by the front driver reverse power coupler 17:

The incorporation is implemented in a manner such that: (a) the horizontal gearset is positioned above the aperture in a horizontal orientation whereby the second gear 57, top gear 59, and connector shaft 65 unit is located at the upper corner of the aperture either next to the horizontal and second vertical edges of the aperture on the driver frame side or next to the horizontal and one vertical edges of the aperture on the passenger frame side while the first gear 56 and input shaft 63 unit is located above the aperture such that the input shaft 63 is aligned with the driver or passenger CV-joint flange 72 or 73; and (b) the vertical gearset and other external components are positioned either next to the second vertical edge of the aperture on the driver frame side in a vertical orientation or next to the one vertical edge of the aperture on the passenger frame side in a vertical orientation. The vertical orientation of the other external components in descending order is the upper leading link mounting bracket 53 is the top component, followed by the output shaft 64, and then the lower leading link mounting bracket 54 is the bottom component.

The alignment refers to a line that passes through the input shaft 63 and driver or passenger CV-joint flange 72 or 73. Each shaft 63 or 64 and mounting bracket 53 or 54 project inward towards the engine bay. The vertical orientation of the other external components replicates the manner in which the upper and lower leading link mounting brackets 53 and 54 are affixed to the frame sides in the suspension system disclosed in the patent application Ser. No. 14/059,062.

Referring to FIGS. 15-17, there is illustrated the components of the offset power coupler 16:

The internal components include the chain 68, first and second gears 66 and 67, input shaft 69, and output shaft 70 whereby the chain 68 has links and each gear has teeth. The first and second gears 66 and 67 are connected to the input and output shafts 69 and 70, respectively. The connection between the first gear 66 and input shaft 69 or second gear 67 and output shaft 70 enables the first gear 66 and input shaft 69 or second gear 67 and output shaft 70 to act as a single unit, respectively. Each unit is rotationally affixed to the inside of the gearbox. The first gear 66 and input shaft 69 unit is spatially separated from the second gear 67 and output shaft 70 unit such that the teeth on the first gear 66 do not contact those on the second gear 67 while the chain 68 is positioned around the first and second gears 66 and 67 such that the links on the chain 68 are able to contact the teeth on the first and second gears 66 and 67. The contact between the links on the chain 68 and teeth on the first and second gears 66 and 67 depicts a rotational interaction between the chain 68 and first and second gears 66 and 67. The rotational interaction between the chain 68 and first and second gears 66 and 67 enables power to be transmitted internally from the first gear 66 and input shaft 69 unit to the second gear 67 and output shaft 70 unit; i.e., from the input shaft 69 to the output shaft 70.

The external components include the input and output shafts 69 and 70 whereby the input and output shafts 69 and 70 protrude out of and occupy opposite sides of the gearbox.

Referring to FIGS. 5, 12, 18, and 19, there is illustrated the location of the offset power coupler 16:

The offset power coupler 16 is directly connected to the front differential housing 14 such that the output shaft 70 of the offset power coupler 16 is adapted to the pinion shaft 71 of the front differential housing 14. The adaptation refers to the output shaft 70 being located inside the shaft end of the pinion shaft 71. The front differential housing 14 is located at the front end of the frame 10 thereby locating the offset power coupler 16 at the front end of the frame 10.

Referring to FIGS. 18, and 20-25, there is illustrated the components of the front or rear differential housing assembly:

The driver and passenger sides of the front or rear differential housing 14 or 15 are machined and then attached to the driver and passenger CV-joint flanges 72 and 73, respectively. On the front differential housing 14, the driver and passenger CV-joint flanges 72 and 73 pivotally connect the front differential housing 14 to the front driver and passenger short axle shafts 23 and 24, while on the rear differential housing 15, the driver and passenger CV-joint flanges 72 and 73 pivotally connect the rear differential housing 15 to the rear driver and passenger short axle shafts 27 and 28, respectively.

The driver or passenger differential housing mounting bracket 51 or 52 consists of a semi-circular flat steel plate 74 and one and a second steel strips 75 and 76. The plate 74 has a large hole 77 whereby the hole 77 is located at the center of the plate 74. The hole 77 is slightly larger than the driver or passenger CV-joint flange 72 or 73 such that the plate 74 can be passed over the driver or passenger CV-joint flange 72 or 73 and attached directly to the driver or passenger side of the: (a) front differential housing 14, or (b) rear differential housing 15, respectively. One and the second strips 75 and 76 each have a first and second ends: the first end of one strip 75 is attached to the plate 74 on one side of the hole 77 while the first end of the second strip 76 is attached to the plate 74 on a side of the hole 77 opposite the one side; whereas, the second end of one strip 75 is attached next to the one vertical edge bordering the aperture while the second end of the second strip 76 is attached next to the second vertical edge bordering the aperture. The aperture is located at the: (a) front driver or passenger frame side, or (b) rear driver or passenger frame side.

Referring to FIGS. 5 and 12, there is illustrated the location of the front or rear differential housing assembly:

The plate 74 and second ends of one and the second strips 75 and 76 for the driver or passenger differential housing mounting bracket 51 or 52 are able to be the plate end and strip ends such that the driver and passenger differential housing mounting brackets 51 and 52 are attached to the driver and passenger sides of the front differential housing 14 on the plate ends and to the front driver and passenger frame sides on the strip ends, respectively. The attachments secure the front differential housing 14 to the front end of the frame 10; and, the securement of the front differential housing 14 to the front end of the frame 10 locates the front differential housing assembly at the front end of the frame 10.

One and the second strips 75 and 76 for the driver and passenger differential housing mounting brackets 51 and 52 are oriented within the front end of the frame 10 in a manner such that: (a) the front differential housing 14 is positioned mid-way between the front driver and passenger reverse power couplers 17 and 18 with the driver and passenger CV-joint flanges 72 and 73 occupying a vertical plane that passes through the apertures and front driver and passenger wheels, and (b) an open space is created between one and the second strips 75 and 76 thereby enabling the underlying front driver or passenger upper and lower leading links 31 and 32 or 33 and 34 and front driver or passenger long axle shaft 25 or 26 to travel upward between one and the second strips 75 and 76 and into the aperture when the suspension compresses. The apertures or aperture are located in the front driver and passenger frame sides or front driver or passenger frame side, respectively.

The plate 74 and second ends of one and the second strips 75 and 76 for the driver or passenger differential housing mounting bracket 51 or 52 are able to be the plate end and strip ends such that the driver and passenger differential housing mounting brackets 51 and 52 are attached to the driver and passenger sides of the rear differential housing 15 on the plate ends and to the rear driver and passenger frame sides on the strip ends, respectively. The attachments secure the rear differential housing 15 to the rear end of the frame 10; and, the securement of the rear differential housing 15 to the rear end of the frame 10 locates the rear differential housing assembly at the rear end of the frame 10.

One and the second strips 75 and 76 for the driver and passenger differential housing mounting brackets 51 and 52 are oriented within the rear end of the frame 10 in a manner such that: (a) the rear differential housing 15 is positioned mid-way between the rear driver and passenger reverse power couplers 19 and 20 with the driver and passenger CV-joint flanges 72 and 73 occupying a vertical plane that passes through the apertures and rear driver and passenger wheels, and (b) an open space is created between one and the second strips 75 and 76 thereby enabling the underlying rear driver or passenger upper and lower leading links 31 and 32 or 33 and 34 and rear driver or passenger long axle shaft 29 or 30 to travel upward between one and the second strips 75 and 76 and into the aperture when the suspension compresses. The apertures or aperture are located in the rear driver and passenger frame sides or rear driver or passenger frame side, respectively.

The mid-way positioning refers to the front or rear differential housing 14 or 15 occupying a vertical plane that passes through the middle of the frame 10 from the front end to the back end of the frame 10.

Referring to FIGS. 4-7 and 11-14, there is illustrated the cooperative interaction between the front or rear driver and passenger reverse power couplers 17 and 18 or 19 and 20 and front or rear suspension system, respectively. The driver or passenger upper and lower leading links 31 and 32 or 33 and 34 extend laterally from the front passenger or driver reverse power coupler 18 or 17 to the driver or passenger steering knuckle 43 or 44, respectively, while the driver or passenger upper and lower leading links 31 and 32 or 33 and 34 extend laterally from the rear passenger or driver reverse power coupler 20 or 19 to the driver or passenger non-steering knuckle 45 or 46, respectively; whereas the driver or passenger upper and lower trailing links 35 and 36 or 37 and 38 extend longitudinally from a point near the middle of the driver or passenger frame side either to the driver or passenger steering knuckle 43 or 44 or to the driver or passenger non-steering knuckle 45 or 46, respectively.

The first end of the driver or passenger upper leading link 31 or 33 is affixed to a flexible joint, the flexible joint is pivotally attached to mounting bracket 53, mounting bracket 53 is affixed either to the middle of the front passenger or driver reverse power coupler 18 or 17 above the output shaft 64, or to the middle of the rear passenger or driver reverse power coupler 20 or 19 above the output shaft 64; while the first end of the driver or passenger lower leading link 32 or 34 is affixed to a flexible joint, the flexible joint is pivotally attached to mounting bracket 54, mounting bracket 54 is affixed either to the bottom of the front passenger or driver reverse power coupler 18 or 17 below the output shaft 64, or to the bottom of the rear passenger or driver reverse power coupler 20 or 19 below the output shaft 64, respectively. Also each shaft 64 and mounting bracket 53 or 54 project inward towards the engine bay. The first ends of the driver or passenger upper and lower trailing links 35 and 36 or 37 and 38 are affixed to flexible joints, the flexible joints are pivotally attached to mounting brackets 55, mounting brackets 55 are vertically affixed to the top and bottom of the driver or passenger frame side near its middle, respectively. Also each mounting bracket 55 projects outward away from the engine bay.

The second ends of the driver or passenger upper leading and trailing links 31 and 35 or 33 and 37 are attached to the driver or passenger upper apex bracket 39 or 41 while the second ends of the driver or passenger lower leading and trailing links 32 and 36 or 34 and 38 are attached to the driver or passenger lower apex bracket 40 or 42, respectively. The driver or passenger upper and lower apex brackets 39 and 40 or 41 and 42 each contain a ball joint, the ball joints are pivotally attached either to the top and bottom of the driver or passenger steering knuckle 43 or 44, or to the top and bottom of the driver or passenger non-steering knuckle 45 or 46, respectively.

The effect of the length of the front driver or passenger long axle shaft 25 or 26 matching that of the driver or passenger upper and lower leading links 31 and 32 or 33 and 34 cooperates with the effect of the vertical orientation of the output shaft 64 and upper and lower leading link mounting brackets 53 and 54 on the front passenger or driver reverse power coupler 18 or 17 in order to enable both the flexible joint on the first end of the front driver or passenger long axle shaft 25 or 26 to be aligned with the flexible joints on the first ends of the driver or passenger upper and lower leading links 31 and 32 or 33 and 34, as well as the flexible joint on the second end of the front driver or passenger long axle shaft 25 or 26 to be aligned with the ball joints, the ball joints pivotally attach the driver or passenger upper and lower apex brackets 39 and 40 or 41 and 42 to the top and bottom of the driver or passenger steering knuckle 43 or 44, the alignments refer to the flexible joint on the first end of the front driver or passenger long axle shaft 25 or 26 occupying a vertical line that passes through the flexible joints on the first ends of the driver or passenger upper and lower leading links 31 and 32 or 33 and 34, and the flexible joint on the second end of the front driver or passenger long axle shaft 25 or 26 occupying a vertical line that passes through the ball joints, respectively. The alignments are maintained throughout the entire range of suspension travel.

The effect of the length of the rear driver or passenger long axle shaft 29 or 30 matching that of the driver or passenger upper and lower leading links 31 and 32 or 33 and 34 cooperates with the effect of the vertical orientation of the output shaft 64 and upper and lower leading link mounting brackets 53 and 54 on the rear passenger or driver reverse power coupler 20 or 19 in order to enable both the flexible joint on the first end of the rear driver or passenger long axle shaft 29 or 30 to be aligned with the flexible joints on the first ends of the driver or passenger upper and lower leading links 31 and 32 or 33 and 34, as well as the flexible joint on the second end of the rear driver or passenger long axle shaft 29 or 30 to be aligned with the ball joints, the ball joints pivotally attach the driver or passenger upper and lower apex brackets 39 and 40 or 41 and 42 to the top and bottom of the driver or passenger non-steering knuckle 45 or 46, the alignments refer to the flexible joint on the first end of the rear driver or passenger long axle shaft 29 or 30 occupying a vertical line that passes through the flexible joints on the first ends of the driver or passenger upper and lower leading links 31 and 32 or 33 and 34, and the flexible joint on the second end of the rear driver or passenger long axle shaft 29 or 30 occupying a vertical line that passes through the ball joints, respectively. The alignments are maintained throughout the entire range of suspension travel.

Referring particularly to FIGS. 6, 7, 13, and 14, there are illustrated the interconnections among the drivetrain elements at the front end of the frame 10. The drivetrain elements at the front end of the frame 10 include the front differential housing 14, front driver and passenger reverse power couplers 17 and 18, front driver and passenger short axle shafts 23 and 24, and front driver and passenger long axle shafts, 25 and 26, respectively.

The front driver short axle shaft 23 has a first and second ends, each end is affixed to a flexible joint whereby the flexible joint on the first end is pivotally attached to the driver CV-joint flange 72 of the front differential housing 14 while that on the second end is pivotally attached to the input shaft 63 of the front driver reverse power coupler 17. Likewise, the front driver long axle shaft 25 has a first and second ends, each end is affixed to a flexible joint whereby the flexible joint on the first end is pivotally attached to the output shaft 64 of the front passenger reverse power coupler 18 while that on the second end is pivotally attached to the front driver wheel hub (not shown).

The front passenger short axle shaft 24 has a first and second ends, each end is affixed to a flexible joint whereby the flexible joint on the first end is pivotally attached to the passenger CV-joint flange 73 of the front differential housing 14 while that on the second end is pivotally attached to the input shaft 63 of the front passenger reverse power coupler 18. Likewise the front passenger long axle shaft 26 has a first and second ends, each end is affixed to a flexible joint whereby the flexible joint on the first end is pivotally attached to the output shaft 64 of the front driver reverse power coupler 17 while that on the second end is pivotally attached to the front passenger wheel hub (not shown).

Referring particularly to FIGS. 4, 5, 11, and 12, there are illustrated the interconnections among the drivetrain elements at the rear end of the frame 10. The drivetrain elements at the rear end of the frame 10 include the rear differential housing 15, rear driver and passenger reverse power couplers 19 and 20, rear driver and passenger short axle shafts 27 and 28, and rear driver and passenger long axle shafts 29 and 30, respectively.

The rear driver short axle shaft 27 has a first and second ends, each end is affixed to a flexible joint whereby the flexible joint on the first end is pivotally attached to the driver CV-joint flange 72 of the rear differential housing 15 while that on the second end is pivotally attached to the input shaft 63 of the rear driver reverse power coupler 19. Likewise the rear driver long axle shaft 29 has a first and second ends, each end is affixed to a flexible joint whereby the flexible joint on the first end is pivotally attached to the output shaft 64 of the rear passenger reverse power coupler 20 while that on the second end is pivotally attached to the rear driver wheel hub (not shown).

The rear passenger short axle shaft 28 has a first and second ends, each end is affixed to a flexible joint whereby the flexible joint on the first end is pivotally attached to the passenger CV-joint flange 73 of the rear differential housing 15 while that on the second end is pivotally attached to the input shaft 63 of the rear passenger reverse power coupler 20. Likewise the rear passenger long axle shaft 30 has a first and second ends, each end is affixed to a flexible joint whereby the flexible joint on the first end is pivotally attached to the output shaft 64 of the rear driver reverse power coupler 19 while that on the second end is pivotally attached to the rear passenger wheel hub (not shown).

Referring particularly to FIGS. 5 and 12, there are illustrated the interconnections among powertrain and drivetrain elements responsible for power transmission. Power is transmitted from the engine 11 to the transmission 12 then from the transmission 12 to the transfer case 13 in a manner typical in the art.

The front drive shaft 21 has a front and rear ends, each end is affixed to a flexible joint whereby the flexible joint on the front end is pivotally attached to the input shaft 69 of the offset power coupler 16 while that on the rear end is pivotally attached to the first output shaft of the transfer case 13; the pivotal attachments enable the front drive shaft 21 to transmit power from the transfer case 13 to the offset power coupler 16. Likewise, the rear drive shaft 22 has a front and rear ends, each end is affixed to a flexible joint whereby the flexible joint on the front end is pivotally attached to the second output shaft of the transfer case 13 while that on the rear end is pivotally attached to the pinion shaft of the rear differential housing 15; the pivotal attachments enable the rear drive shaft 22 to transmit power from the transfer case 13 to the rear differential housing 15.

The first and second output shafts of the transfer case 13 are aligned with the input shaft 69 of the offset power coupler 16 and pinion shaft of the rear differential housing 15 in order to minimize the angles adopted by the flexible joints on the front and rear drive shafts 21 and 22, respectively; whereby, the angles of the flexible joints are minimized in order to facilitate the smooth, efficient, and vibration-free transmission of power from the transfer case 13 to the offset power coupler 16 and rear differential housing 15. The alignment between the one output shaft of the transfer case 13 and input shaft 69 of the offset power coupler 16 is the result of: one, "clocking" the offset power coupler 16 about its connection to the front differential housing 14; and two, rotating the front differential housing 14 about its driver and passenger differential housing mounting brackets 51 and 52, respectively, the clocking and rotating performed until the input shaft 69 of the offset power coupler 16 is aligned with the first output shaft of the transfer case 13; the alignment refers to the input shaft 69 of the offset power coupler 16 occupying a line that passes through the one output shaft of the transfer case 13. The alignment between the second output shaft of the transfer case 13 and the pinion shaft of the rear differential housing 15 is the result of rotating the rear differential housing 15 about its driver and passenger differential housing mounting brackets 51 and 52, respectively, the rotating performed until the pinion shaft of the rear differential housing 15 is aligned with the second output shaft of the transfer case 13; the alignment refers to the pinion shaft of the rear differential housing 15 occupying a line that passes through the second output shaft of the transfer case 13.

Referring particularly to FIGS. 4, 5, 11, 12, and 19, there are illustrated the interconnections among drivetrain components responsible for power transmission:

The adaptation between the output shaft 70 of the offset power coupler 16 and pinion shaft 71 of the front differential housing 14 enables power to be transmitted from the offset power coupler 16 to the front differential housing 14.

The pivotal attachments between the first ends of the front driver and passenger short axle shafts 23 and 24 and driver and passenger CV-joint flanges 72 and 73 of the front differential housing 14 and that between the second ends of the front driver and passenger short axle shafts 23 and 24 and input shafts 63 of the front driver and passenger reverse power couplers 17 and 18 enable the front driver and passenger short axle shafts 23 and 24 to transmit power from the front differential housing 14 to the front driver and passenger reverse power couplers 17 and 18, respectively; while the pivotal attachments between the first ends of the front passenger and driver long axle shafts 26 and 25 and output shafts 64 of the front driver and passenger reverse power couplers 17 and 18 and that between the second ends of the front passenger and driver long axle shafts 26 and 25 and front passenger and driver wheel hubs enable the front passenger and driver long axle shafts 26 and 25 to transmit power from the front driver and passenger reverse power couplers 17 and 18 to the front passenger and driver wheel hubs, respectively.

The pivotal attachments between the first ends of the rear driver and passenger short axle shafts 27 and 28 and driver and passenger CV-joint flanges 72 and 73 of the rear differential housing 15 and that between the second ends of the rear driver and passenger short axle shafts 27 and 28 and input shafts 63 of the rear driver and passenger reverse power couplers 19 and 20 enable the rear driver and passenger short axle shafts 27 and 28 to transmit power from the rear differential housing 15 to the rear driver and passenger reverse power couplers 19 and 20, respectively; while the pivotal attachments between the first ends of the rear passenger and driver long axle shafts 30 and 29 and output shafts 64 of the rear driver and passenger reverse power couplers 19 and 20 and that between the second ends of the rear passenger and driver long axle shafts 30 and 29 and rear passenger and driver wheel hubs enable the rear passenger and driver long axle shafts 30 and 29 to transmit power from the rear driver and passenger reverse power couplers 19 and 20 to the rear passenger and driver wheel hubs, respectively.

While the invention has been illustrated and described as embodied in a vehicle drivetrain, it is not intended to be limited to the details shown, since it will be understood that various omissions, modifications, substitutions and changes in the forms and details of the device illustrated and in its operation can be made by those skilled on the art without departing in any way from the scope and spirit of the present invention.

The listing of claims 1-22 below includes claims that were excerpted from the parent application Ser. No. 14/087,552 and new claims: claims that were excerpted from the parent application Ser. No. 14/087,552 include claims 1, 14-22 whereby claim 1 is excerpted from claim 1, claims 14-16 are excerpted from claim 5, and claims 17, 18, 19, 20, 21, and 22 are excerpted from claims 7, 8, 9, 11, 12, and 13, respectively; claims 2-13 are new.

What is claimed is:

1. A drivetrain for use with a vehicle having a frame, powertrain, and front and rear suspension systems, the drivetrain comprising:

front driver and passenger reverse power couplers and rear driver and passenger reverse power couplers, each reverse power coupler is a gearbox comprised of internal and external components, the external components include an input shaft and an output shaft;

an offset power coupler, the offset power coupler is a gearbox comprised of internal and external components, the external components include an input shaft and an output shaft;

front and rear differential housing assemblies; the front differential housing assembly includes a front differential housing, driver and passenger differential housing mounting brackets, and driver and passenger constant velocity (CV)-joint flanges; the rear differential housing assembly includes a rear differential housing, driver and passenger differential housing mounting brackets, and driver and passenger constant velocity (CV)-joint flanges; wherein each differential housing has a pinion shaft and driver and passenger sides, the driver and passenger sides are attached to the driver and passenger differential housing mounting brackets and driver and passenger CV-joint flanges, respectively; wherein the pinion shaft for the front differential housing has a shaft end;

front driver and passenger short axle shafts, front driver and passenger long axle shafts, rear driver and passenger short axle shafts, and rear driver and passenger long axle shafts;

wherein the frame comprises a driver frame side and a passenger frame side, the frame and each frame side having a front end, rear end, and middle;

wherein the powertrain includes an engine, transmission, transfer case, and front and rear drive shafts; wherein the transfer case comprises an input shaft and first and second output shafts;

wherein each driver and passenger frame side has two apertures, one aperture is located at the front end of each frame side while the second aperture is located at the rear end of each frame side; wherein each aperture is an open space that is fabricated into each frame side, each aperture has a rectangular shape comprised of three straight edges, a horizontal edge and two vertical edges, the horizontal edge is positioned at a top of the aperture between the two vertical edges;

wherein the front and rear suspension systems each possess driver upper and lower leading links, passenger upper and lower leading links, driver upper and lower trailing links, and passenger upper and lower trailing links, each link has a first end and a second end.

2. The drivetrain of claim 1, wherein the internal components of each reverse power coupler include first, second, and third gears, the reverse power coupler input shaft, and the reverse power coupler output shaft; each gear has teeth; wherein the first and second gears are connected to the reverse power coupler input and output shafts, the connection between the first gear and reverse power coupler input shaft or second gear and reverse power coupler output shaft enables the first gear and reverse power coupler input shaft or second gear and reverse power coupler output shaft to act as a single unit, respectively; wherein each unit and the third gear are rotationally affixed to an inside of the gearbox; wherein the rotational affixments of each unit and third gear enable the teeth on the first and second gears to contact those on the third gear, the contact of the teeth on the first or second gear with those on the third gear depicts a rotational interaction between the first or second gear and third gear; wherein the rotational interactions between the first and third gears and between the second and third gears enable power to be transmitted internally from the first gear and reverse power coupler input shaft unit to the third gear, then from the third gear to the second gear and reverse power coupler output shaft unit; wherein the transmission of power from the first gear and reverse power coupler input shaft unit to the third gear, then from the third gear to the second gear and reverse power coupler output shaft unit is the transmission of power from the reverse power coupler input shaft to the reverse power coupler output shaft.

3. The drivetrain of claim 1, wherein the internal components of each reverse power coupler include horizontal and vertical gearsets, the reverse power coupler input shaft, the reverse power coupler output shaft, and a connector shaft; wherein each gearset is comprised of a chain and two gears, each chain has links while each gear has teeth; wherein the chain and two gears in the horizontal gearset are the one chain and first and second gears while the chain and two gears in the vertical gearset are the second chain and top and bottom gears; wherein the horizontal gearset is oriented horizontally while the vertical gearset is oriented vertically, the horizontal gearset is positioned above the vertical gearset such that the second gear is next to the top gear; wherein the first gear is connected to the reverse power coupler input shaft, the bottom gear is connected to the reverse power coupler output shaft, and the second gear and top gear are connected to the connector shaft; wherein the connection between the first gear and reverse power coupler input shaft, bottom gear and reverse power coupler output shaft, or second gear, top gear, and connector shaft enables the first gear and reverse power coupler input shaft, bottom gear and reverse power coupler output shaft, or second gear, top gear, and connector shaft to act as a single unit, respectively; wherein the horizontal gearset includes the first gear and reverse power coupler input shaft unit and second gear, top gear, and connector shaft unit while the vertical gearset includes the second gear, top gear, and connector shaft unit and bottom gear and reverse power coupler output shaft unit; wherein each unit is rotationally affixed to the inside of the gearbox; wherein the first gear and reverse power coupler input shaft unit is spatially separated from the second gear, top gear, and connector shaft unit such that the teeth on the first gear do not contact those on the second gear while the one chain is positioned around the first and second gears such that the links on the one chain are able to contact the teeth on the first and second gears; wherein the second gear, top gear, and connector shaft unit is spatially separated from the bottom gear and reverse power coupler output shaft unit such that the teeth on the top gear do not contact those on the bottom gear while the second chain is positioned around the top and bottom gears such that the links on the second chain are able to contact the teeth on the top and bottom gears; wherein the contact between the links on the one chain and teeth on the first and second gears depicts a rotational interaction between the one chain and first and second gears while the contact between the links on the second chain and teeth on the top and bottom gears depicts a rotational interaction between the second chain and top and bottom gears; wherein the rotational interactions between the one chain and first and second gears and between the second chain and top and bottom gears enable power to be transmitted internally from the first gear and reverse power coupler input shaft unit to the second gear, top gear, and connector shaft unit, then from the second gear, top gear, and connector shaft unit to the bottom gear and reverse power coupler output shaft unit; wherein the transmission of power from the first gear and reverse power coupler input shaft unit to the second gear, top gear, and connector shaft unit, then from the second gear, top gear, and connector shaft unit to the bottom gear and reverse power coupler output shaft unit is the transmission of power from the reverse power coupler input shaft to the reverse power coupler output shaft.

4. The drivetrain of claim 1, wherein the external components of each reverse power coupler include an upper and lower leading link mounting brackets; wherein the reverse power coupler input and output shafts protrude out of the gearbox while the upper and lower leading link mounting brackets are affixed to an outer surface of the gearbox, all external components are positioned on a same side of the gearbox.

5. The drivetrain of claim 1, wherein the front driver or passenger reverse power coupler is incorporated into the front driver or passenger frame side proximate a front driver or passenger wheel in a manner such that the front driver or passenger reverse power coupler is an integral part of the front driver or passenger frame side while the rear driver or passenger reverse power coupler is incorporated into the rear driver or passenger frame side proximate a rear driver or passenger wheel in a manner such that the rear driver or passenger reverse power coupler is an integral part of the rear driver or passenger frame side, respectively.

6. The drivetrain of claim 5, wherein the incorporation of each reverse power coupler is implemented in a manner such that the internal and external components are positioned either next to the second vertical edge of the aperture on the driver frame side in a vertical orientation or next to the one vertical edge of the aperture on the passenger frame side in the vertical orientation; wherein the vertical orientation of the external components in descending order is the reverse power coupler input shaft being the top component, followed by the upper leading link mounting bracket, then the reverse power coupler output shaft, and then the lower leading link mounting bracket being the bottom component; wherein each reverse power coupler shaft and mounting bracket project inward towards an engine bay.

7. The drivetrain of claim 3, wherein the incorporation of each reverse power coupler is implemented in a manner such that: (a) the horizontal gearset is positioned above the aperture and (b) the vertical gearset is positioned beside the aperture.

8. The drivetrain of claim 1, wherein the internal components of the offset power coupler include a chain, first and second gears, the offset power coupler input shaft, and the offset power coupler output shaft; wherein the first and second gears are connected to the offset power coupler input and offset power coupler output shafts, respectively, enabling both the first gear and offset power coupler input shaft and the second gear and offset power coupler output shaft to act as a single unit; wherein each unit is rotationally affixed to an inside of the gearbox; wherein a rotational interaction between the chain and first and second gears enables power to be transmitted internally from the first gear and offset power coupler input shaft unit to the second gear and offset power coupler output shaft unit; wherein the transmission of power from the first gear and input shaft unit to the second gear and output shaft unit is the transmission of power from the offset power coupler input shaft to the offset power coupler output shaft.

9. The drivetrain of claim 1, wherein the offset power coupler is directly connected to the front differential housing such that the output shaft of the offset power coupler is adapted to the pinion shaft of the front differential housing, the adaptation is the output shaft being located inside the shaft end of the pinion shaft; wherein the front differential housing is located at the front end of the frame thereby locating the offset power coupler at the front end of the frame.

10. The drivetrain of claim 1,
wherein the driver and passenger sides of the front or rear differential housing are machined and then attached to the driver and passenger CV-joint flanges; wherein on the front differential housing, the driver and passenger CV-joint flanges pivotally connect the front differential housing to the front driver and passenger short axle shafts, while on the rear differential housing, the driver and passenger CV-joint flanges pivotally connect the rear differential housing to the rear driver and passenger short axle shafts, respectively;
wherein the driver or passenger differential housing mounting bracket consists of a semi-circular flat steel plate and two steel strips, the plate has a large hole whereby the hole is located at a center of the plate; wherein the hole is slightly larger than the driver or passenger CV-joint flange such that the plate can be passed over the driver or passenger CV-joint flange and attached directly to the driver or passenger side of the: (a) front differential housing, or (b) rear differential housing, respectively; wherein the two strips each have first and second ends: the first end of one strip is attached to the plate on one side of the hole while the first end of the second strip is attached to the plate on a side of the hole opposite the one side; whereas, the second end of one strip is attached next to the one vertical edge bordering the aperture while the second end of the second strip is attached next to the second vertical edge bordering the aperture; wherein the aperture is located at the: (a) front driver or passenger frame side, or (b) rear driver or passenger frame side.

11. The drivetrain of claim 10, wherein the two strips for the driver and passenger differential housing mounting brackets are oriented within the front end of the frame in a manner such that: (a) the front differential housing is positioned mid-way between the front driver and passenger reverse power couplers with the driver and passenger CV-joint flanges occupying a vertical plane that passes through the apertures and front driver and passenger wheels, and (b) an open space is created between the two strips thereby enabling the underlying front driver or passenger upper and lower leading links and front driver or passenger long axle shaft to travel upward between the two strips and into the aperture when the suspension compresses.

12. The drivetrain of claim 10, wherein the two strips for the driver and passenger differential housing mounting brackets are oriented within the rear end of the frame in a manner such that: (a) the rear differential housing is positioned mid-way between the rear driver and passenger reverse power couplers with the driver and passenger CV-joint flanges occupying a vertical plane that passes through the apertures and rear driver and passenger wheels, and (b) an open space is created between the two strips thereby enabling the underlying rear driver or passenger upper and lower leading links and rear driver or passenger long axle shaft to travel upward between the two strips and into the aperture when the suspension compresses.

13. The drivetrain of claim 1, wherein the front or rear driver and passenger reverse power couplers cooperatively interact with the front or rear suspension system, respectively;
wherein the front driver or passenger upper and lower leading links extend laterally from the front passenger or driver reverse power coupler to a driver or passenger steering knuckle, respectively; wherein the front driver or passenger upper and lower trailing links extend longitudinally from a point near the middle of the driver or passenger frame side to the driver or passenger steering knuckle, respectively; wherein the rear driver or passenger upper and lower leading links extend laterally from the rear passenger or driver reverse power coupler to a driver or passenger non-steering knuckle, respectively; wherein the rear driver or passenger upper and lower trailing links extend longitudinally from a point near the middle of the driver or passenger frame side to the driver or passenger non-steering knuckle, respectively.

14. The drivetrain of claim 13, wherein the first end of the front driver or passenger upper leading link is affixed to a flexible joint, the flexible joint is pivotally attached to the mounting bracket, the mounting bracket is affixed to a middle of the front passenger or driver reverse power coupler above the reverse power coupler output shaft, while the first end of the front driver or passenger lower leading link is affixed to a flexible joint, the flexible joint is pivotally attached to the mounting bracket, the mounting bracket is affixed to a bottom of the front passenger or driver reverse power coupler below the reverse power coupler output shaft, respectively, each reverse power coupler shaft and mounting bracket project inward towards the engine bay; wherein the first ends of the front driver or passenger upper and lower trailing links are affixed to flexible joints, the flexible joints are pivotally attached to mounting brackets, the mounting brackets are vertically affixed to a top and bottom of the driver or passenger frame side, respectively, each mounting bracket projects outward away from the engine bay; wherein the second ends of the front driver or passenger upper leading and trailing links are attached to an upper apex bracket while the second ends of the front driver or passenger lower leading and trailing links are attached to a lower apex bracket, respectively; wherein the upper and lower apex brackets each contain a ball joint, the ball joints being pivotally attached to a top and bottom of the driver or passenger steering knuckle, respectively.

15. The drivetrain of claim 13, wherein the first end of the rear driver or passenger upper leading link is affixed to a flexible joint, the flexible joint is pivotally attached to the mounting bracket, the mounting bracket is affixed to a middle of the rear passenger or driver reverse power coupler above the reverse power coupler output shaft, while the first end of the rear driver or passenger lower leading link is affixed to a flexible joint, the flexible joint is pivotally attached to the mounting bracket, the mounting bracket is affixed to a bottom of the rear passenger or driver reverse power coupler below the reverse power coupler output shaft, respectively, each reverse power coupler shaft and mounting bracket project inward towards the engine bay; wherein the first ends of the rear driver or passenger upper and lower trailing links are affixed to flexible joints, the flexible joints are pivotally attached to mounting brackets, the mounting brackets are vertically affixed to a top and bottom of the driver or passenger frame side, respectively, each mounting bracket projects outward away from the engine bay; wherein the second ends of the rear driver or passenger upper leading and trailing links are attached to the upper apex bracket while the second ends of the rear driver or passenger lower leading and trailing links are attached to the lower apex bracket, respectively; wherein the upper and lower apex brackets each contain the ball joint, the ball joints being pivotally attached to a top and bottom of the driver or passenger non-steering knuckle, respectively.

16. The drivetrain of claim 1, wherein a front drivetrain includes the front differential housing, front driver and passenger reverse power couplers, front driver and passenger short axle shafts, and front driver and passenger long axle shafts;

wherein the front driver short axle shaft has first and second ends, each end is affixed to a flexible joint, the flexible joint on the first end is pivotally attached to the driver CV-joint flange of the front differential housing while the flexible joint on the second end is pivotally attached to the input shaft of the front driver reverse power coupler; wherein the front driver long axle shaft has first and second ends, each end is affixed to a flexible joint, the flexible joint on the first end is pivotally attached to the output shaft of the front passenger reverse power coupler while the flexible joint on the second end is pivotally attached to a front driver wheel hub;

wherein the front passenger short axle shaft has first and second ends, each end is affixed to a flexible joint, the flexible joint on the first end is pivotally attached to the passenger CV-joint flange of the front differential housing while the flexible joint on the second end is pivotally attached to the input shaft of the front passenger reverse power coupler; wherein the front passenger long axle shaft has first and second ends, each end is affixed to a flexible joint, the flexible joint on the first end is pivotally attached to the output shaft of the front driver reverse power coupler while the flexible joint on the second end is pivotally attached to a front passenger wheel hub.

17. The drivetrain of claim 1, wherein a rear drivetrain includes the rear differential housing, rear driver and passenger reverse power couplers, rear driver and passenger short axle shafts, and rear driver and passenger long axle shafts;

wherein the rear driver short axle shaft has first and second ends, each end is affixed to a flexible joint, the flexible joint on the first end is pivotally attached to the driver CV-joint flange of the rear differential housing while the flexible joint on the second end is pivotally attached to the input shaft of the rear driver reverse power coupler; wherein the rear driver long axle shaft has first and second ends, each end is affixed to a flexible joint, the flexible joint on the first end is pivotally attached to the output shaft of the rear passenger reverse power coupler while the flexible joint on the second end is pivotally attached to a rear driver wheel hub;

wherein the rear passenger short axle shaft has first and second ends, each end is affixed to a flexible joint, the flexible joint on the first end is pivotally attached to the passenger CV-joint flange of the rear differential housing while the flexible joint on the second end is pivotally attached to the input shaft of the rear passenger reverse power coupler; wherein the rear passenger long axle shaft has first and second ends, each end is affixed to a flexible joint, the flexible joint on the first end is pivotally attached to the output shaft of the rear driver reverse power coupler while the flexible joint on the second end is pivotally attached to a rear passenger wheel hub.

18. The drivetrain of claim 1, wherein power is transmitted from the engine to the transmission and then from the transmission to the transfer case via a direct connection between the engine and transmission and between the transmission and transfer case; wherein the direct connections comprise: (a) a back of the engine being connected directly to a front of the transmission such that a crankshaft of the engine is adapted to an input shaft of the transmission, and (b) a back of the transmission being connected directly to the transfer case such that an output shaft of the transmission is adapted to the input shaft of the transfer case;

wherein the front drive shaft has front and rear ends, each end is affixed to a flexible joint, the flexible joint on the front end is pivotally attached to the input shaft of the offset power coupler while the flexible joint on the rear end is pivotally attached to the first output shaft of the transfer case, the pivotal attachments enable the front drive shaft to transmit power from the transfer case to the offset power coupler; wherein the rear drive shaft has front and rear ends, each end is affixed to a flexible joint, the flexible joint on the front end is pivotally attached to the second output shaft of the transfer case while the flexible joint on the rear end is pivotally attached to the pinion shaft of the rear differential housing, the pivotal attachments enable the rear drive shaft to transmit power from the transfer case to the rear differential housing.

19. The drivetrain of claim 9, wherein the adaptation between the output shaft of the offset power coupler and pinion shaft of the front differential housing enables power to be transmitted from the offset power coupler to the front differential housing.

20. The drivetrain of claim 16, wherein the pivotal attachments between the first ends of the front driver and passenger short axle shafts and driver and passenger CV-joint flanges of the front differential housing and those between the second ends of the front driver and passenger short axle shafts and input shafts of the front driver and passenger reverse power couplers enable the front driver and passenger short axle shafts to transmit power from the front differential housing to the front driver and passenger reverse power couplers, respectively; wherein the pivotal attachments between the first ends of the front passenger and driver long axle shafts and output shafts of the front driver and passenger reverse power couplers and those between the second ends of the front passenger and driver long axle shafts and front passenger and driver wheel hubs enable the front passenger and driver long axle shafts to transmit power from the front driver and passenger reverse power couplers to the front passenger and driver wheel hubs, respectively.

21. The drivetrain of claim 17, wherein the pivotal attachments between the first ends of the rear driver and passenger short axle shafts and driver and passenger CV-joint flanges of the rear differential housing and those between the second ends of the rear driver and passenger short axle shafts and input shafts of the rear driver and passenger reverse power couplers enable the rear driver and passenger short axle shafts to transmit power from the rear differential housing to the rear driver and passenger reverse power couplers, respectively; wherein the pivotal attachments between the first ends of the rear passenger and driver long axle shafts and output shafts of the rear driver and passenger reverse power couplers and those between the second ends of the rear passenger and driver long axle shafts and rear passenger and driver wheel hubs enable the rear passenger and driver long axle shafts to transmit power from the rear driver and passenger reverse power couplers to the rear passenger and driver wheel hubs, respectively.

\* \* \* \* \*